(12) United States Patent
Fuji

(10) Patent No.: US 6,172,956 B1
(45) Date of Patent: Jan. 9, 2001

(54) OPTICAL RECORDING MEDIUM AND OPTICAL RECORDING/REPRODUCING DEVICE, AND MANUFACTURING METHOD OF OPTICAL RECORDING MEDIUM

(75) Inventor: Hiroshi Fuji, Soraku-gun (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/162,555

(22) Filed: Sep. 29, 1998

Related U.S. Application Data

(62) Division of application No. 08/787,601, filed on Jan. 22, 1997, now Pat. No. 5,852,599.

(30) Foreign Application Priority Data

Jan. 26, 1996 (JP) .................................................. 8-11688

(51) Int. Cl.$^7$ ...................................................... G11B 7/00
(52) U.S. Cl. .......................... 369/58; 369/47; 369/44.13
(58) Field of Search .............................. 369/47, 48, 49, 369/50, 54, 58, 59, 44.13, 44.26, 44.28, 275.1, 275.4

(56) References Cited

U.S. PATENT DOCUMENTS

| | | | |
|---|---|---|---|
| 5,210,738 | 5/1993 | Iwata et al. | 369/275.1 |
| 5,339,302 | 8/1994 | Takahashi et al. | 369/54 |
| 5,377,178 | 12/1994 | Saito et al. | 369/124 |
| 5,506,824 | 4/1996 | Fairchild | 369/48 |
| 5,615,185 | * 3/1997 | Horikiri | 369/44.13 |
| 5,696,752 | 12/1997 | Hajjar et al. | 369/124 |
| 5,909,412 | * 6/1999 | Nakayama et al. | 369/44.13 X |
| 6,028,828 | * 2/2000 | Maeda | 369/44.13 X |

FOREIGN PATENT DOCUMENTS

| | | |
|---|---|---|
| 0-487-321-A2 | 5/1992 | (EP) . |
| 314538 | 11/1993 | (JP) . |
| 07161045 | 6/1995 | (JP) . |
| 210873 | 8/1995 | (JP) . |

\* cited by examiner

*Primary Examiner*—Muhammad Edun
(74) *Attorney, Agent, or Firm*—David G. Conlin; George W. Neuner; Dike, Bronstein, Roberts and Cushman

(57) ABSTRACT

A magneto-optical disk 1 has a track, wherein one of the sidewalls (sidewall 4) of a groove 2 is wobbled by a wobble signal, and is provided with a notch 5 in the track having a different frequency from the wobble signal. The absolute position of the magneto-optical disk 1 is detected with a sample bit stored by the notch 5 of the track, and an information bit is stored with a recording/reproducing clock synchronizing with that position. By forming the notch 5 in this manner, information can always be recorded at the same information bit position, regardless of how many times information is rewritten. Therefore, a gap area and a buffer area, which have conventionally been essential, are not needed on the optical disk. Consequently, it is possible to use a recording area effectively.

5 Claims, 22 Drawing Sheets

FIG. 12
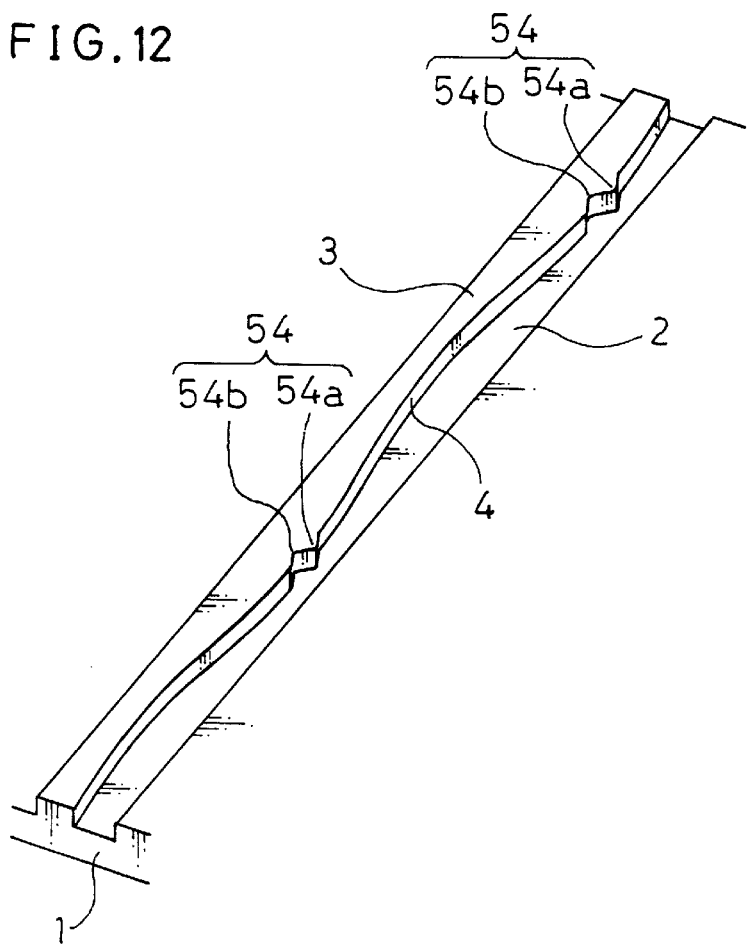
FIG. 13
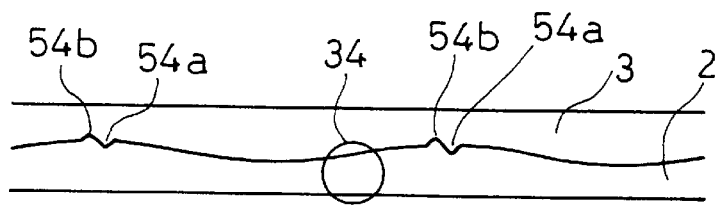
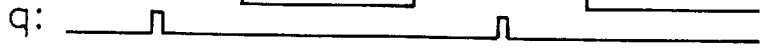

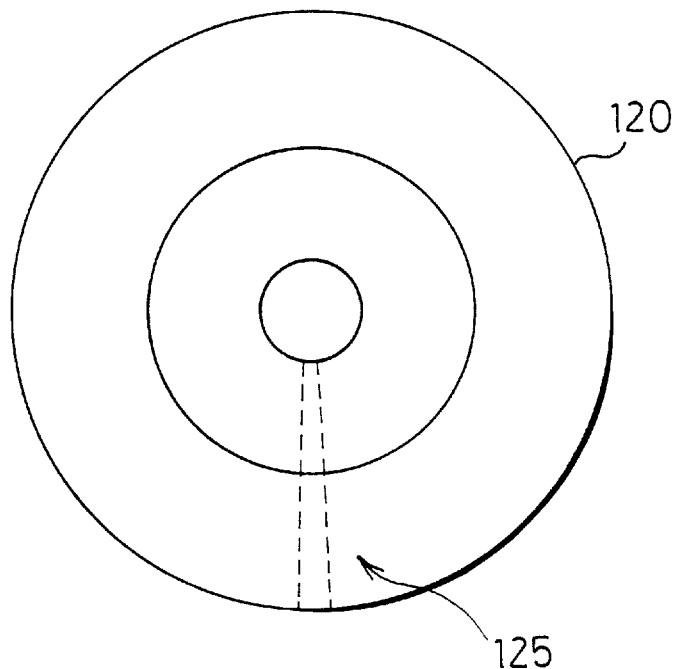
FIG. 29
PRIOR ART
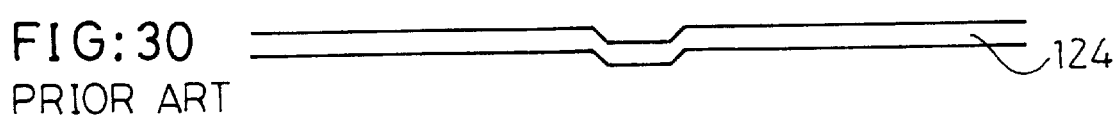
FIG. 30
PRIOR ART
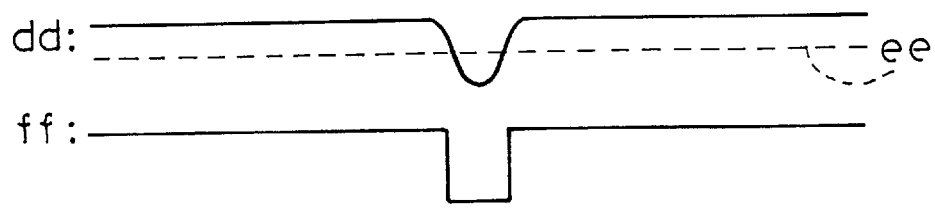

US 6,172,956 B1

OPTICAL RECORDING MEDIUM AND OPTICAL RECORDING/REPRODUCING DEVICE, AND MANUFACTURING METHOD OF OPTICAL RECORDING MEDIUM

This is a divisional application of U.S. Ser. No. 08/787,601, filed Jan. 22, 1997, now U.S. Pat. No. 5,852,599.

FIELD OF THE INVENTION

The present invention relates to an optical recording medium having a track in which one of the sidewalls of a groove wobbles according to, for example, either rotation synchronization information or address information or both, and further relates to an optical recording/reproducing device for recording information into the optical recording medium, and further relates to a manufacturing method for manufacturing such an optical recording medium.

BACKGROUND OF THE INVENTION

Conventional technology has been developed for recording information both in the land and in the groove to improve the track density of an optical disk as a recording medium. For example, Japanese Laid-Open Patent Application No. 5-314538/1993 (Tokukaihei 5-314538) discloses a method of forming a track for storing information both in the land and in the groove thereof.

Referring to FIG. 27, a magnified view of an optical disk, the following is an explanation about the method of forming a track disclosed in the above laid-open patent application. An optical disk 101 has a groove 102, 104, 106, etc. and a land 103, 105, etc. provided alternately to form respective information recording tracks. For example, a sidewall 108, one of the sidewalls of the groove 104, wobbles according to, for example, rotation synchronization information and address information. In other words, the sidewall 108 stores therein a wobble signal that is FM-modulated from the rotation synchronization information and/or address information.

The optical disk 101 is configured so that the distance between the adjacent wobbling sidewalls (e.g., the distance between the sidewall 108 and an adjacent wobbling sidewall 107 of the groove 102, or the distance between the sidewall 108 and another adjacent wobbling sidewall 109 of the groove 106) is longer than the diameter of a light beam 110. Therefore, the light beam 110 is prevented from reading out the wobble signal stored in the sidewall 107 and 109.

With the optical disk 101 configured as above, as the optical beam 110 tracks, for example, the groove 104, a wobble signal is reproduced from the sidewall 108 of the groove 104. Rotation synchronization information and address information are read out of the wobble signal to control rotation of the optical disk and reproduce address information. In this case, the distance between the wobbling sidewall 108 of the groove 104 and the wobbling sidewall 109 of the adjacent groove 106 is set to be longer than the diameter of the optical beam 110. Therefore, the periphery of the light beam 110 is configured not to reach the sidewall 109 when the groove 104 is tracked. Therefore, the wobble signal of the sidewall 108 of the groove 104 is not interfered by the wobble signal of the sidewall 109.

When the land 103 is tracked, a wobble signal is reproduced out of the sidewall 108 in the same manner as above. In this case, since only the sidewall 107 of the adjacent groove 102 wobbles and is located opposite from the land 103, the periphery of the light beam 110 does not reach the sidewall 107 when the land 103 is tracked. Therefore, the wobble signal of the sidewall 108 of the land 103 is not interfered by the wobble signal of the sidewall 107.

Consequently, if the optical disk 101 configured in the above manner is used, the cross-talk of the wobble signal is reduced, the rotation of the optical disk 101 is surely controlled, and the address information is precisely read out. Hereinafter, the track in which a wobble signal is stored only in one of the sidewalls of the land and of the groove will be referred to as a one-side wobbling track. Therefore, the groove 104 and the land 103 oppositely sandwiching the wobbling sidewall 108 have the same rotation synchronization information and address information.

A well-known method of improving the recording density of an optical disk is a constant liner velocity (CLV) method. Referring to FIG. 28, the following is an explanation about information recording/reproducing device that carries out the CLV recording with respect to an optical disk of a one-side wobbling track.

First, to record information with the CLV method, a wobble signal including rotation synchronization information is stored with the CLV method into one of the sides of the track of the optical disk 101 in advance. An optical pickup 111 radiates a light beam to the optical disk 101 provided with a wobbling track, and extracts a wobble signal aa out of a track error signal or a total signal that are reproduced from the reflected light. The wobble signal aa is inputted to an address information reproducing section 112 and to a CLV rotation control section 113. Then a clock cc of a constant frequency is inputted from a crystal oscillator 114 to the address information reproducing section 112 and to the CLV rotation control section 113.

Next, in the address information reproducing section 112, address information is FM-modulated from the wobble signal aa according to the clock cc. The CLV control section 113 compares the phase of the rotation synchronization signal included in the wobble signal aa and the phase of the clock cc, and outputs a drive signal bb to a spindle motor 115 so that the phases synchronize. The rotation of the optical disk 101 is controlled in this manner. Since the wobble signal aa is stored with the CLV method, the rotation of the optical disk 101 can be controlled with the CLV method.

Incidentally, in order to access recording information at high speeds, the position where the recording of the information starts needs to synchronize with the rotation of the disk and thus always the same. In this manner, the address in search can be found by predicting the rotation of the disk during the search for information, thereby enabling high speed search. Japanese Laid-Open Patent Application No. 4-184718/1992 (Tokukaihei 4-184718), "OPTICAL DISK AND OPTICAL DISK DEVICE", discloses a method of storing a reference position in the optical disk in advance in the above manner, and determining the position where the recording of the information starts according to that reference position. Referring to FIGS. 29 and 30, the following explains the above method.

In the optical disk 120, the groove 121 sandwiched between the land 123 and 124 functions as a track for recording/reproducing the information. The track 121 has an index mark 122, a wobbling once for every round, that is stored when the track 121 is formed in the optical disk 120.

A comparator in a device (not shown) for reproducing the optical disk 120 compares a track error signal dd read out of the index mark 122 and a slice level ee to obtain an index mark detection signal ff (reference signal). The index mark detection signal ff functions as a reference for the absolute position once for a round of the optical disk 120. The index mark detection signal ff can format the address information in synchronization with the rotation of the optical disk 120.

The length of the index mark 122 is set to be approximately equal to an information recording bit, and has a position detection precision of less than the length of the information bit (not more than 1 micron). In other words, the position where the recording of the information starts is lined up once for every round highly precisely by storing the index mark 122 in advance.

However, even if the position where the recording of the information starts is determined, the positions of the recording bits thereafter vary depending on a variation of the rotation of the optical disk. When the recording is completed, the variation have been accumulated and greatly changes the position where the recording ends. Therefore, the position where the recording ends and a position where the next recording starts may overlap.

Therefore, a conventionally typical method of avoiding the overlapping with the position where the next recording starts is to shift forward in advance the position where the recording ends, and to thus provide a so-called gap area (or sometimes referred to as a buffer area) before the position where the next recording starts so as to compensate for the variation.

As the position where the recording ends varies, a position of the reproducing clock for reproducing the recording data shifts every time at the position where the next recording starts. Therefore, it is necessary to lead in a phase locked loop (PLL) every time the reproducing clock position shifts. Therefore, an area to which the PLL is led in is provided at the beginning of the recording data area of the optical disk 120.

Since the above-mentioned gap area and lead-in area for the PLL reduces the utilization factor of the recording area, there occurs a problem that the recording capacity of the optical disk is reduced. The ratio of the reduction to the total capacity is about 9%, according to Japanese Industrial Standards for present rewritable optical disks.

Moreover, when a target address is searched for, optical disks having the above one-side wobbling track have a problem that the land and the groove oppositely sandwiching the wobbling sidewall carry the same address information and cannot be distinguished from each other. In other words, if an address is designated when information is recorded or reproduced, there exist two identical addresses, thus causing inconvenience in address management.

SUMMARY OF THE INVENTION

An object of the present invention is to offer an optical recording medium, an optical recording/reproducing device, and a method of manufacturing an optical recording medium that are capable of recording information with absolute position precision equal to a bit unit by carving a notch bit, in addition to a wobble signal, in a track at a certain frequency, by detecting the notch bit, and by generating a recording/reproducing clock synchronizing with the notch bit, and is to offer a useful optical recording medium, an optical recording/reproducing device, and a method of manufacturing an optical recording medium that can deal with conventional problems: for example, the land and groove oppositely sandwiching a wobbling sidewall share the same address information and cannot be distinguished when a target address is searched for.

In order to accomplish the above object, the optical recording medium of the present invention records information into a track, one of the sidewalls of the track wobbling at a predetermined frequency in accordance with either rotation synchronization information or address information, or both, and includes a notch bit of a reference signal generating a recording/reproducing clock, the notch bit being carved and stored on the one of the sidewalls of the track at a different frequency from the wobbling frequency.

With the above optical recording medium, since the notch bit of the reference signal generating the recording/reproducing clock is carved and stored, absolute position of the optical recording medium can be detected with the notch bit. Moreover, since information bit is recorded with the recording/reproducing clocks synchronizing with the detected position, the information can always be recorded at the same information bit position, regardless of how many times the information is rewritten. Consequently, a gap area and a buffer area, which have conventionally been essential, are not needed on the optical disk, and a recording area can be used effectively.

In addition, preferably, the optical recording medium that is capable of recording information with absolute position precision equal to a bit unit can be offered by detecting the notch bit and generating the recording/reproducing clock synchronizing with the notch bit.

Besides, preferably, if the notch bit is formed in synchronization with repetition of the wobbling, the land and the groove can be distinguished. This configuration enables the optical recording medium to deal with conventional problems: for example, the land and groove oppositely sandwiching a wobbling sidewall share the same address information and cannot be distinguished when a target address is searched for.

The device for recording/reproducing information into/ out of the aforementioned optical recording medium is, for example, an optical recording/reproducing device for recording/reproducing information into/out of an optical recording medium that has a track, one of the sidewalls of the track wobbling in accordance with either rotation synchronization information or address information, or both, and that is provided with a notch bit in the track having a different frequency from a wobble signal read out of the wobbling of the sidewall of the track, the optical recording/ reproducing device including: a recording medium drive control section for controlling a relative velocity between the optical recording medium and a light beam in accordance with the wobble signal reproduced out of the track; a reference signal extracting section for extracting a reference signal out of the notch bit of the track; a recording/ reproducing clock generating section, to which the reference signal is inputted, for generating a recording/reproducing clock synchronizing with the reference signal; and a recording/reproducing section for synchronizing a recording position of a bit for recording information with a position of the notch bit, and for thus recording/reproducing information in accordance with the recording/reproducing clock.

Moreover, the method of manufacturing the aforementioned optical recording medium is, for example, a method including the steps of: (1) cutting one of the sidewalls of the track out of an optical disk substrate with a first light beam; and (2) cutting the other sidewall of the track out of the optical disk substrate with a second light beam that wobbles, wherein, in the step (2), a notch bit is formed at a predetermined frequency on the sidewall of the track that is cut with the second light beam.

For a fuller understanding of the nature and advantages of the invention, reference should be made to the ensuing detailed description taken in conjunction with the accompanying drawings.

BRIEF DESCRIPTION OF THE DRAWINGS

FIG. 12 is a perspective view schematically showing a track shape of a magneto-optical disk of even another embodiment in accordance with the present invention.

FIG. 13 is an explanatory view showing signal waveforms when the magneto-optical disk shown in FIG. 12 is tracked.

FIG. 29 is a drawing showing an optical disk having a conventional wobble mark.

FIG. 30 is an explanatory drawing showing a signal waveform when the optical disk shown in FIG. 29 is tracked.

DESCRIPTION OF THE EMBODIMENTS

[First Embodiment]

Figure 1:
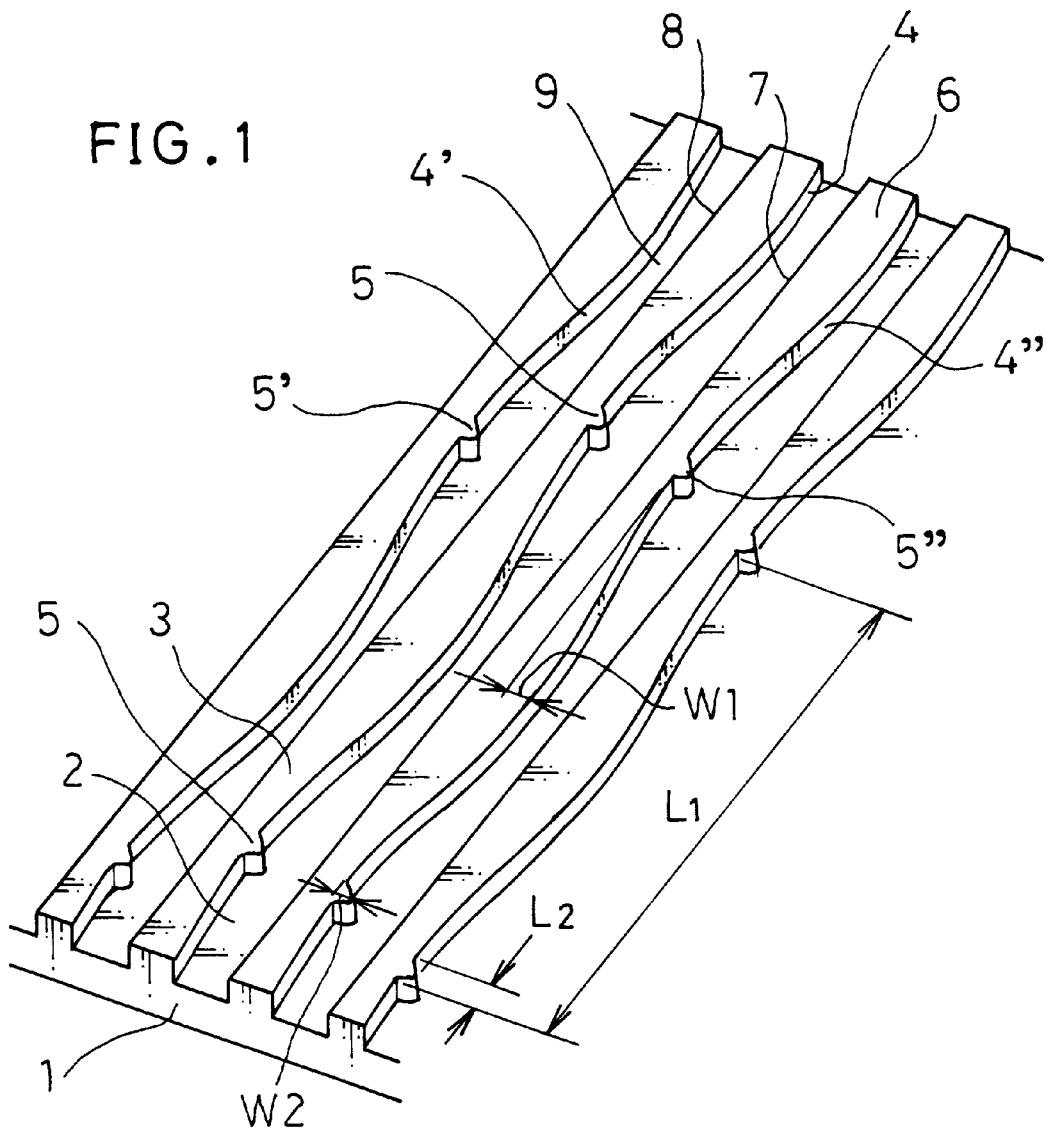
FIG. 1 is a perspective view schematically showing a track shape of a magneto-optical disk of an embodiment in accordance with the present invention.

The following description will discuss an embodiment in accordance with the present invention. In the present embodiment, a magneto-optical disk is used as an example of the optical recording medium. FIG. 1 shows a track shape of the magneto-optical disk in accordance with the present invention.

As shown in FIG. 1, a wobbling sidewall 4 sandwiched between a pair of a groove 2 and a land 3 is formed in a magneto-optical disk 1 upon manufacture of the magneto-optical disk 1. A wobble signal is stored on the sidewall 4. The wobble signal is FM-modulated with a signal obtained by reading the wobbling with a light beam, i.e., either rotation synchronization information or address information or both. The cycle L1 of the wobble signal is a few dozen microns, and the frequency of the wobble signal is a few dozen kHz when the linear velocity is 3 m/s and is set so as not to overlap a tracking servo band.

Moreover, on the sidewall 4 between the groove 2 and the land 3, notches 5 is carved and stored in synchronization with repetition of the wobble signal. In other words, the notch 5 has a different frequency from the wobble, and constitutes a notch bit of a reference signal generating a later-mentioned recording/reproducing clock.

The intervals between the notches 5 are set to the cycle L1 of the wobble signal. The length L2 of the notch 5 is set to a few hundred nms so that the signal frequency for detecting the track does not overlap the wobble signal. Specifically, the length of the notch 5 is about 1/100 the wobble signal stored in a cycle of a few dozen microns, and the frequency of the detected signal is set to be a few MHz. The notch 5 enables the precision of the absolute position in a circumference direction on the track to be not more than the diameter of the light beam (not more than 1 µm).

In FIG. 1, apart from the notch 5 formed on the sidewall 4 of the groove 2, there are more notches such as a notch 5' formed on the sidewall 4' of the groove 9, and a notch 5" formed on the sidewall 4" of the land 6. However, since these notches 5', 5", etc. are identical with the notch 5 formed on the sidewall 4 of the groove 2, unless otherwise specified, the following discussion will explain only the notch 5 formed on the sidewall 4 of the groove 2.

The notch 5 is formed only on the wobbling sidewall 4. That is, the notch 5 is formed neither on the sidewall 7 nor on the sidewall 8 that are opposite from the sidewall 4. Suppose that the notch 5 is formed on the sidewalls 7 and 8 as well as on the sidewall 4, when a light beam tracks the adjacent groove 9, there occurs a leakage of a signal from the notch 5 into a signal from the notch 5' corresponding to the groove 9, or so called cross-talk.

Moreover, when the notches 5, 5', etc. are formed with the CLV method, phases of these notches are not synchronized, which will cause disturbance in extraction of a clock for later-mentioned recording/reproducing. But, if the notch 5 is formed only on the wobbling sidewall 4 as shown in FIG. 1, the cross-talk of the notch signal can be prevented, and, as a result, a precise notch signal can be obtained.

Note also that when a notch is formed on the sidewalls 7, 8, etc., but not on the sidewall 4, the cross-talk of the signal can be prevented in the same manner. In short, when a notch is formed on one of the sidewalls of the groove, the cross-talk of the notch signal can be prevented.

The notch 5 is provided in large numbers for every round of the track, and used for extracting a clock for later-mentioned recording/reproduction synchronizing with a signal read out of the notch 5. If the recording/reproducing clock can follow up a variation in the disk rotation, a conventionally provided gap area can be eliminated.

As discussed above, the variation in the disk rotation needs to be sampled with a signal read out of the notch 5 to eliminate the gap area with the recording/reproducing clock. That is, according to Nyquist sampling velocity, a frequency fs (=1/signal detection cycle) at which a signal read out of the notch 5 is discontinuous needs to be not less than twice the frequency band fd of the variation in the disk rotation (fs≧2fd). Since the rotation of the disk is controlled by a signal read out of the wobbling, the frequency band fd of the rotation variation is not more than half the frequency fw of the wobble signal (fd≦fw/2). For example, it is understood that if fs≧fw is set, fs≧fw≧2fd, and the recording/reproducing clock can follow up the rotation variation.

In order to prevent the notch 5 from disturbing focus servo, track servo, etc., the frequency fs at which the signal read out of the notch 5 is discontinuous needs to be higher than a servo band ft (fs>ft). Since the frequency fw of the wobble signal is set to be higher than the servo band ft in advance as earlier mentioned (fw>ft), it is understood that if fs≧fw is set as above, fs≧fw>ft, and the notch 5 can be prevented from disturbing the servo.

FIG. 1 shows an example of a frequency satisfying a condition of fs=fw. Moreover, the length L2 of the notch 5 is a few hundred nms and is in the same order as a recording mark. However, if a recording mark is recorded adjacent to the notch 5 in this example, the cross-talk is likely to cause wrong reproduction of the recording mark. When such wrong reproduction happens often, the recording mark should not be recorded adjacent to the notch 5. If the recording mark is not recorded adjacent to the notch 5 in this manner, reduction in capacity of recording data is likely to result. Therefore, in order to prevent wrong reproduction, and to prevent reduction in capacity of recording data, the number of the notches cannot be set to be larger than necessary.

Therefore, in the example shown in FIG. 1, the notch 5 takes up a few hundred nms for every few dozen µms. This causes a 1% reduction in the recording density, which is smaller than the 9% reduction in the recording density caused by the lead-in area of a conventional gap and PLL. In short, if the number of the notches 5 is set to be the same as that of the cycle of the wobbling, it is possible to surely make the recording/reproducing clock follow up the variation in the disk rotation, prevent disturbance to the servo, and improve the recording density.

The actual rotation control of the magneto-optical disk 1 synchronizes to a crystal clock a signal obtained by dividing the frequency of a read-out wobble signal by an integral number. Therefore, 2fd≦nfw (n: an integral number). If fs/n=fw, the notch 5 satisfying the conditions, fs≧2fd and fs>ft, can be stored.

Moreover, the frequency of the wobbling is well separated from the servo band. Therefore, the frequency of a read-out signal of the notch 5 is allowed to be set in a wide range, and the number of the notches 5 can be also set in that wide range.

Moreover, since the length L2 of the notch 5 in the magneto-optical disk 1 of the present application is a few hundred nms, which is smaller than the diameter of the light spot, the read-out signal quantity decreases. Meanwhile, since the frequency L1 of the wobbling is a few dozen µms, which is larger than the diameter of the light spot, the read-out signal quantity does not change. In other words, the signal quantity read out of the notch 5 is small, compared to the signal quantity read out of the wobbling. Therefore, as shown in FIG. 1, the height w2 of the notch is made larger than the amplitude w1 of the wobbling (w2>w1). This can prevent a decrease in the signal quantity read out of the notch.

Moreover, in order to take as large a read-out signal of the notch 5 as possible, and to prevent the read-out signal of the notch 5 from leaking into the read-out signals of the notches 5', 5", etc. of the adjacent track, the notch 5 needs to be formed, for example, as shown in FIG. 1, where the groove 2 is the widest so that the center of the notch 5 is as close to the center of the amplitude of the wobbling as possible.

The notch 5 of the present embodiment is formed so as to protrude into the groove 2, but the front point thereof does not reach the land 6. If the notch 5 is formed in this manner, the signal of the notch 5 can be reproduced only when the groove 2 and the land 3 are tracked, and cross-talk does not happen with another notch portion that is adjacent perpendicularly to the track in the same manner as the wobble signal.

Moreover, the land and the groove can be distinguished (to be explained in detail later) by forming, as mentioned above, the notch 5 synchronizing with the repetition of the wobbling. When the notch 5 is to be formed to synchronize with the wobbling in this manner, the notch 5 must be formed only on the sidewall 4. This is because if the notch 5 is formed on the sidewalls 7 and 8, the notch synchronizes with the wobbling of the sidewall 4, but does not synchronize with the wobbling of the sidewalls 4' and 4". If the wobbling is to be stored with the CAV method, the notch needs to be formed on the sidewalls 7 and 8 instead of the sidewall 4.

Moreover, if the address information is stored by the notch 5 instead of the wobbling, the number of the notches 5 may increase and the recording density of the track may decrease. Therefore, if the notch 5 only stores a reference signal denoting the absolute position, and the address information is stored by the wobble signal, the decrease of the recording density of the track due to the increase of the number of the notches 5 can be minimized.

The magneto-optical disk 1 shown in FIG. 1 is an example in which the center of the notch 5 is formed to be as close to the center of the amplitude of the wobbling as possible. The notch 5' shown in FIG. 6 may be used, instead of the magneto-optical disk 1, and still produce the same effects. The notch 5' is carved where the groove 2 is the narrowest as a concave into the sidewall 4 with the front point thereof not reaching the groove 9.

Figure 2:
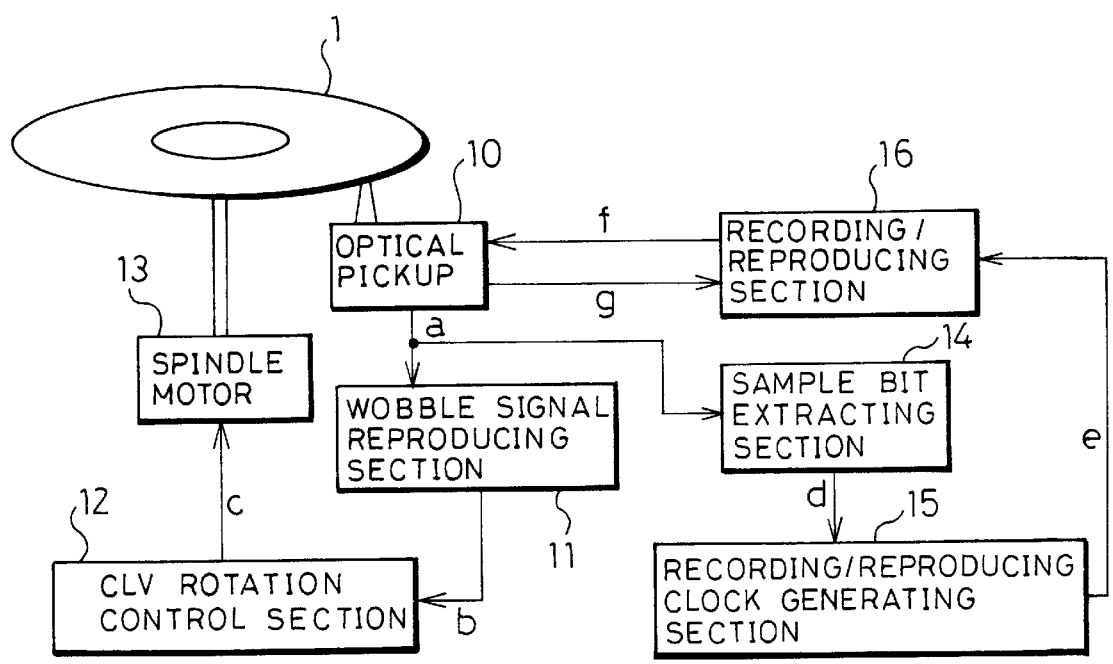
FIG. 2 is a block diagram schematically showing a configuration of a magneto-optical recording/reproducing device for carrying out recording/reproducing information into/out of the magneto-optical disk.

The following will explain a magneto-optical recording/reproducing device as an optical recording/reproducing device for recording/reproducing information into/out of the magneto-optical disk 1 configured as above. The magneto-optical recording/reproducing device is, as shown in FIG. 2, composed of an optical pickup 10, a wobble signal reproducing section 11, a CLV rotation control section 12, a spindle motor 13, a sample bit extracting section 14, a recording/reproducing clock generating section 15, and a recording/reproducing section 16.

The wobble signal reproducing section 11 reproduces a wobble signal b from an electric signal a read in by the optical pickup 10.

The CLV rotation control section 12 has functions as recording medium drive control means for controlling a relative velocity between the magneto-optical disk 1 and the light beam from the optical pickup 10 in accordance with the wobble signal b.

The sample bit extracting section 14 has a function as reference signal extracting means for extracting a sample bit d, a reference signal, from the electric signal a read in by the optical pickup 10.

The recording/reproducing clock generating section 15 has a function as recording/reproducing clock generating means for generating a recording/reproducing clock synchronizing with the sample bit d.

The recording/reproducing section 16 has a function as recording/reproducing means for recording/reproducing information by synchronizing the storing position of the bit for the recording information with the position of the notch 5 according to the recording/reproducing clock.

Therefore, the magneto-optical recording/reproducing device configured as above radiates a light beam from optical pickup 10 to the magneto-optical disk 1, converts the reflected light into the electric signal a in the optical pickup 10, and outputs the electric signal a to the wobble signal reproducing section 11 and the sample bit extracting section 14.

The wobble signal reproducing section 11 generates a track error signal or a total signal (to be described later) from the electric signal a, and extracts the wobble signal b from either the track error signal or the total signal. The wobble signal b is inputted to the CLV rotation control section 12.

The CLV rotation control section 12 controls the rotation of the magneto-optical disk 1 by comparing a phase of a reference clock (described later in detail) for controlling rotation and a phase of a rotation synchronization signal contained in the wobble signal b, and then outputting a drive signal c to the spindle motor 13 so that the phases agree with each other.

Since the wobble signal b is stored with the CLV method, the rotation of the magneto-optical disk 1 can be controlled with the CLV method. When the wobble signal b is stored with a constant angular velocity (CAV) method, the rotation can be controlled with the CAV method. The rotation control of the magneto-optical disk with the CAV method will be described later.

The sample bit extracting section 14 extracts the sample bit d by binarizing an electric signal a reproduced out of a notch 5 on the sidewall of a track of the magneto-optical disk 1, and outputs the extracted sample bit d to the recording/reproducing clock generating section 15.

The recording/reproducing clock generating section 15 generates a recording/reproducing clock e from the sample bit d, and then outputs the recording/reproducing clock e to the recording/reproducing section 16. Since the absolute position of the sample bit d is recorded precisely within a few dozen nms, the absolute position on the track of the magneto-optical disk 1 can be obtained as precisely as a bit with the recording/reproducing clock e synchronizing with the sample bit d.

The recording/reproducing section 16 records information into magneto-optical disk 1 by outputting a recording signal f to the optical pickup 10 according to the recording/reproducing clock e when the information is to be recorded. Therefore, it is possible to record into magneto-optical disk 1 not only a starting position of recording data, but also every recording bit through the last recording data with absolute position precision of less than a bit unit.

In the recording/reproducing section 16, since a reproduced signal g outputted from the optical pickup 10 when the information is to be reproduced is inputted, and the information recorded in the magneto-optical disk 1 is reproduced according to the recording/reproducing clock e, it is possible to reproduce a recording bit highly precisely in the same manner. In other words, since the information can be recorded highly precisely from the starting position of the recording through the ending position of the recording, a gap area, PLL lead-in area, etc. provided for a conventional position shift are not necessary, thereby increasing the recording capacity.

Figure 3:
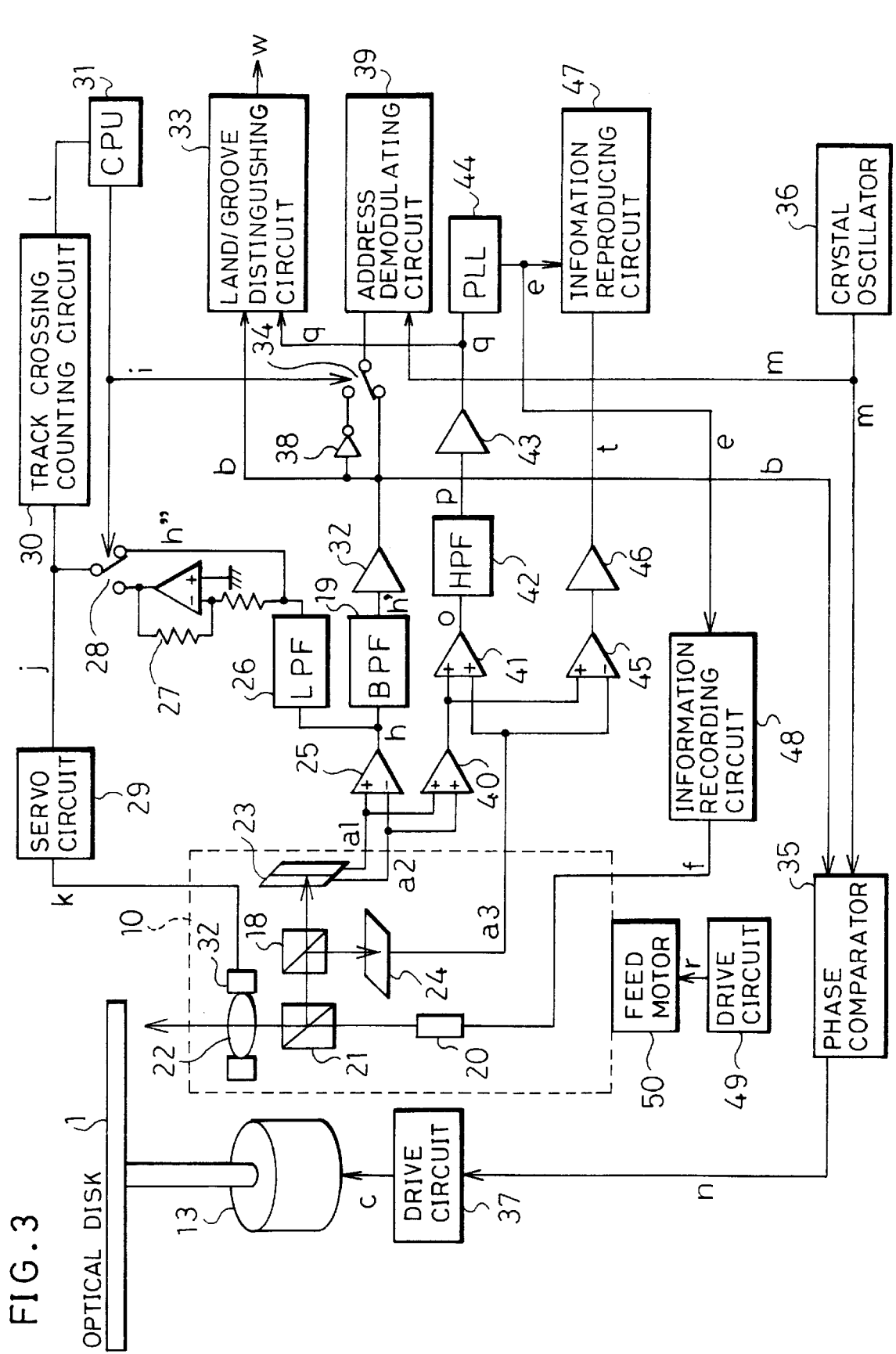
FIG. 3 is a schematic circuit diagram of the magneto-optical recording/reproducing device shown in FIG. 2.

The following description explains in more detail the magneto-optical recording/reproducing device configured as above. In the magneto-optical recording/reproducing device, as shown in FIG. 3, a light beam outputted from a semiconductor laser 20 in the optical pickup 10 passes a polarization beam splitter 21, is converged by an objective lens 22, and radiated at the magneto-optical disk 1.

The light reflected at the magneto-optical disk 1 is converged again by the objective lens 22, turned vertically by the polarization beam splitter 21, and splitted into two polarization directions by a polarization beam splitter 18 for differential detection of a later-mentioned magneto-optical signal. One of the reflected and splitted lights is guided to a two-portioned photo detector 23 and converted into electric signals a1 and a2, whereas the other light is guided to a photo detector 24 and converted into an electric signal a3.

The electric signals a1 and a2 are inputted to a differential amplifier 25. The wobble signal and the sample bit signal reproduced out of the notch are removed by passing a push-pull signal h through a low pass filter (LPF) 26, in order to obtain a track error signal h". The track error signal h" is inputted to one of the two input terminals of a switching circuit 28, whereas a signal obtained by inverting the polarity of the track error signal h" with a inverting circuit 27 is inputted to the other terminal of the switching circuit 28.

The switching circuit 28 counts the number of tracks upon access by selecting the land or the groove according to an instruction signal i outputted from a CPU 31 for selecting either the land or the groove, feeding back to a servo circuit 29 a track error signal (hereinafter, will be simply referred to as a track error signal) j corresponding to the selected land or groove, and then inputting the track error signal into a track crossing counting circuit 30.

The servo circuit 29, transmits a control signal k to an objective lens actuator 32 according to the selected track error signal j, and carries out the track servo to either the land or the groove.

The track crossing counting circuit 30 sends the number of track crossings 1 to CPU 31. The CPU 31 controls the access of the optical pickup 10 to a target track address while monitoring the number of track crossings.

On the other hand, by passing the push-pull signal h obtained with the differential amplifier 25 through a band pass filter (BPF) 19, a wobble signal h' from which the track error signal and the sample bit signal have been removed can be obtained. The wobble signal h' is inputted to the comparator 32 to be binarized. Then, the binarized wobble signal b is inputted to one of the inputs of the land/groove distinguishing circuit 33, one of the inputs of the switching circuit 34, the other input of the switching circuit 34 through an inverter 38, and a phase comparator 35.

The phase comparator 35 compares the phase of the wobble signal b and the phase of a reference clock m outputted from a crystal oscillator 36, and then transfers a phase error signal n to a drive circuit 37. The drive circuit 37 controls the rotation of the spindle motor 13 by outputting the rotation drive signal c to the spindle motor 13 in accordance with the phase error signal n. The magneto-optical disk 1 is controlled with the CLV method in this manner.

Moreover, an address demodulating circuit 39 demodulates an address with the wobble signal b whose polarity is selected by the switching circuit 34 in accordance with the reference clock m from the crystal oscillator 36.

Moreover, the electric signals a1 and a2 are inputted to an adder 40. The added signal is further added to the electric signal a3 by an adder 41, and is subtracted by a subtractor 45. An output signal o of the adder 41 is a total signal of the photo detectors 23 and 24. A high pass filter (HPF) 42 removes a wobble signal component from the output signal o to extract only the sample bit signal p.

The sample bit signal p is binarized by the comparator 43. The binarized sample bit q is inputted to the land/groove distinguishing circuit 33 and the PLL 44.

The land/groove distinguishing circuit 33, to which the wobble signal b and the sample bit q are inputted, distinguishes the land and the groove as described later in detail. The PLL 44 generates the recording/reproducing clock e synchronizing with the sample bit q and inputs the recording/reproducing clock e to an information reproducing circuit 47 and an information recording circuit 48.

The signal s, outputted from the subtractor 44, is a magneto-optical signal obtained by subtracting the output signals of the photo detectors 23 and 24. The signal s is binarized by the comparator 46, and a binarized signal t is reproduced by the information reproducing circuit 47 in accordance with the recording/reproducing clock e. The information can be demodulated in synchronization with the reproduced bit in this manner.

To record information into the magneto-optical disk 1, it is possible to record recording bits with absolute position precision of less than a bit unit by outputting the recording signal f from the information recording circuit 48 to the semiconductor laser 20 in accordance with the recording/reproducing clock e.

The drive circuit 49 outputs a feed motor control signal r to a feed motor 50, and controls the access of the optical pickup 10 while counting the number of the tracks. The sample bit signal p can be extracted also by inputting the push-pull signal h, instead of the total signal o, to the high pass filter 42.

Figure 4:
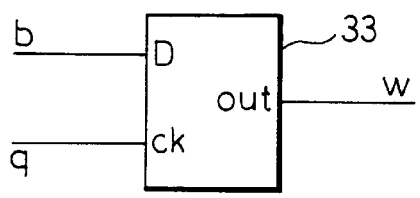
FIG. 4 is a schematic drawing showing a configuration of a land/groove distinguishing circuit provided in the circuit shown in FIG. 3.

FIG. 4 shows an example of the land/groove distinguishing circuit 33 shown in FIG. 3. A D-type flip flop (SN 7474 made by Texas Instruments) is used as the land/groove distinguishing circuit 33, which is configured so that the wobble signal b is inputted at the D input terminal thereof, the sample bit q is inputted at the ck input terminal thereof, and a land/groove distinguishing signal w is outputted. It becomes possible to distinguish the land and the groove in this manner (to be described later in detail).

Figure 5A:
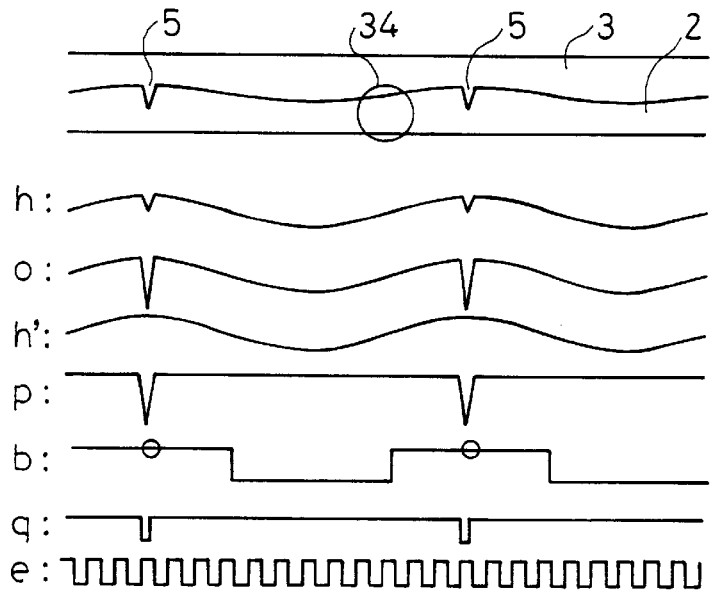
FIG. 5(a) is an explanatory drawing showing signal waveforms when the groove of the magneto-optical disk is tracked with a circuit shown in FIG. 3.
Figure 5B:
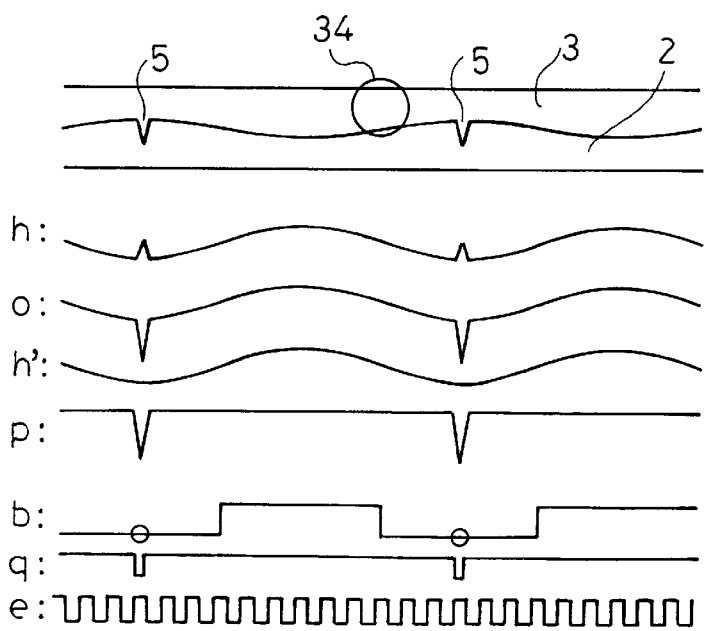
FIG. 5(b) is an explanatory drawing showing signal waveforms when the land of the magneto-optical disk is tracked with a circuit shown in FIG. 3.

FIGS. 5(a) and 5(b) are drawings to explain waveforms in circuits shown in FIGS. 3 and 4.

Referring to FIG. 5(a), as the light beam 34 tracks the groove 2, the push-pull signal h shown in FIG. 3 is reproduced. The frequency band of the push-pull signal h is divided into three. The signal in the lowest band is a tracking error signal, the signal in the medium band is a wobble signal, and the signal in the highest band is a sample bit signal. The wobble signal h' is obtained by passing the push-pull signal h through the band pass filter 19, and thus removing the track error signal and the sample bit signal. As binarized by the comparator 32, the wobble signal h' is binarized, and the digitized wobble signal b is obtained.

Moreover, as to the sample bit signal p obtained by passing the total signal o through the high pass filter 42 shown in FIG. 3, only a frequency component of the sample bit is extracted and then binarized to obtain the sample bit q.

Note that even if the push-pull signal h, instead of the total signal o, is passed through the high pass filter, the sample bit q can be obtained in the same manner. In this case, since the push-pull signal h is a signal of one of the polarization planes of the PBS (a light detecting element), the push-pull signal h contains a magneto-optical signal. Since this band overlaps the band of the sample bit q, the signal-to-noise ratio of the sample bit q may decrease.

But, since the magneto-optical signal has been removed from the total signal o, the total signal o is appropriate for extracting the sample bit q. However, when the reflected light is directed to the two-portioned detector 23 from a light path before being applied to the PBS, this is not the case.

As the land/groove distinguishing circuit 33 shown in FIG. 4 samples the wobble signal b at the timing of a rising of this sample bit q, the land/groove distinguishing signal w is always high, and it is possible to identify the tracking of the groove 4. Moreover, if the sample bit q is inputted to the PLL 44 shown in FIG. 3, the recording/reproducing clock e synchronizing with the sample bit q can be outputted. By recording/reproducing in accordance with the recording/reproducing clock e, it is always possible to carry out synchronized recording/reproduction with respect to an absolute position in a circumference direction of the track. It is thus possible to improve the recording density.

Now referring to FIG. 5(b), the following description explains tracking of the land 3. As the light beam 34 tracks the land 3, the push-pull signal h is reproduced. The wobble signal h' is obtained by passing the push-pull signal h through the band pass filter 19 and thus removing the track error signal and the sample bit. However, the polarity of that wobble signal h' is reversed from the polarity of the wobble signal h' shown in FIG. 5(a). The digitized wobble signal b is obtained by binarizing the wobble signal h' with the comparator 32.

Moreover, as to the sample bit signal p obtained by passing the total signal o through the high pass filter 42, only a frequency component of the sample bit is extracted. The sample bit g can be obtained by binarizing the frequency component as in FIG. 5(b).

As the land/groove distinguishing circuit 33 shown in FIG. 4 samples the wobble signal b at the timing of a rising of this sample bit g, the land/groove distinguishing signal w is always low unlike in FIG. 5(b), and it is possible to identify the tracking of the land 3. Moreover, if the sample bit g is inputted to the PLL 44 shown in FIG. 3, the recording/reproducing clock e synchronizing with the sample bit g can be outputted. It is thus possible to perform highly-dense recording density as in FIG. 5(a).

As described so far, with the optical recording medium and the optical recording/reproducing device in accordance with the present invention, since the absolute position of the magneto-optical disk is detected with the sample bit that is stored with the notch in the track, and the recording/reproducing clock that is synchronized with the position by the PLL is extracted, regardless of how many times the information bit is rewritten with a recording circuit in accordance with the clock, it is always possible to record the information bit at the absolute position.

Conventionally, the gap area and the buffer area are provided, because it is difficult to record information bits at the respective absolute positions thereof. However, the present invention does not need these areas and therefore can use the recording area more efficiently.

With the optical recording medium of the present embodiment, since the notch bit is stored only on the wobbling sidewall, the cross-talk from the notch that is adjacent perpendicularly to the track can be reduced, and the sample bit signal can be precisely detected.

Moreover, if the depth of the notch, measured perpendicularly to the track, is small as in the optical recording medium of the present embodiment, the light beam does not reach a notch of the adjacent sidewall. Therefore, the cross-talk from the notch portion that is adjacent perpendicularly to the track can be reduced, and the sample bit signal can be precisely detected.

Moreover, if the sample bit is recorded in synchronization with the wobble signal as in the optical recording medium of the present embodiment, the polarity of the wobble signal at the position of the sample bit is opposite for the land and for the groove. Therefore, it is possible to distinguish the land and the groove by detecting the polarity. Conventionally, since the land and the groove sandwiching the wobbling sidewall have the same address information, two recording areas share the same address, which makes address management difficult. However, with the present invention, since it is possible to distinguish the land and the groove as mentioned above, the addresses of the land and of the groove can be separated according to that distinguishing information, which makes address management easier.

The above description has discussed an example of extracting the recording/reproducing clock and distinguishing the land and the groove by storing the notch in synchronization with the wobbling of the sidewall. On the other hand, if the notch is stored without being synchronized, although it is difficult to distinguish the land and the groove, the recording/reproducing clock can be extracted precisely, and improvement of the recording density can be attempted. Moreover, it is needless to mention that if the storing position precision of the notch is low, and if the synchronization with the repetition of the wobbling of the sidewall is low, although it is difficult to extract the recording/reproducing clock precisely, it is possible only to precisely distinguish the land and the groove, and the address management becomes easier.

Figure 7:
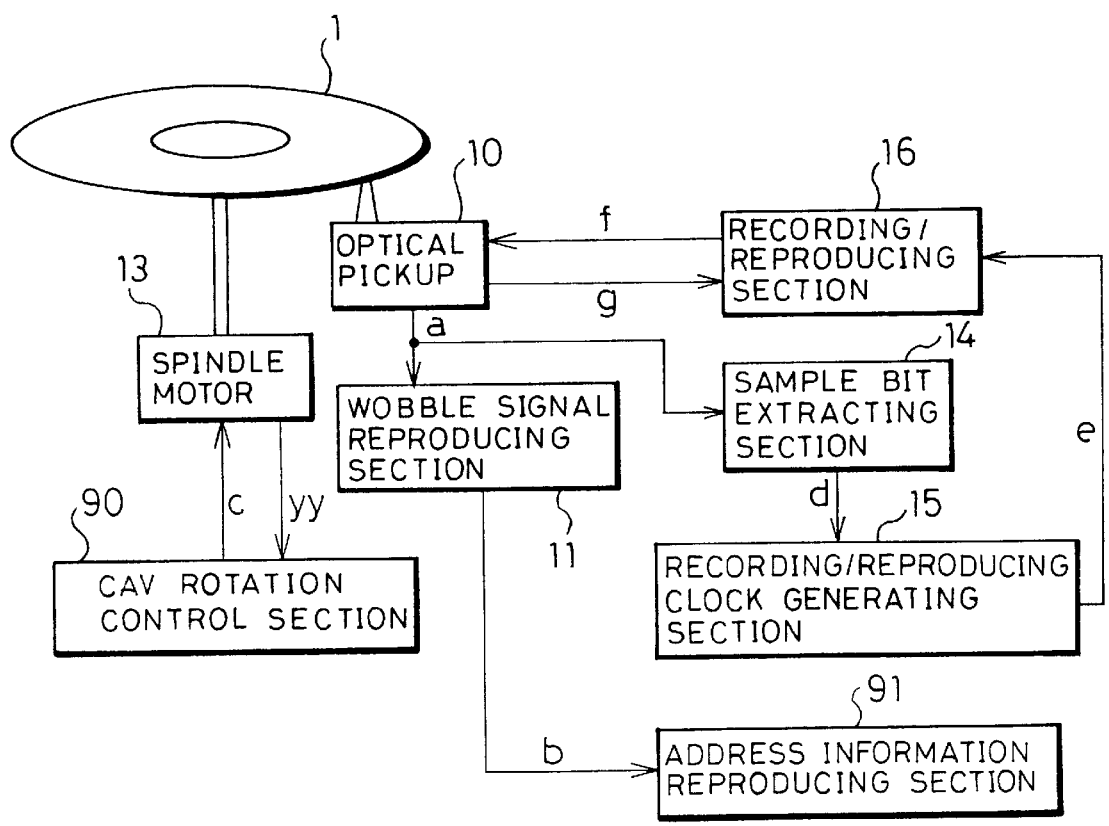
FIG. 7 is a block diagram schematically showing a configuration of the other magneto-optical disk in accordance with the present invention.

Moreover, in the present invention, it is possible to use the magneto-optical recording/reproducing device shown in FIG. 7, instead of the magneto-optical recording/reproducing device shown in FIG. 2. As shown in FIG. 7, the magneto-optical recording/reproducing device has a configuration including a CAV rotation control section 90, instead of the CLV rotation control section 12 shown in FIG. 2, as the recording medium drive control means, and further including an address information reproducing section 91 as address information reproducing means for reproducing address information.

The CAV rotation control section 90 is configured so as to receive a rotation signal yy that is outputted from a rotation signal generator (not shown) contained in the spindle motor 13 and that is in synchronization with the rotation of the disk, and to output the drive signal c to the spindle motor 13 so that the phase of the rotation signal yy becomes constant. The CAV rotation control section 90 controls the magneto-optical disk 1 to rotate at a constant rotation in this manner.

Moreover, the magneto-optical disk 1 has address information stored in advance by the wobbling of the sidewall of the groove. With this, the reproduced wobble signal b is inputted to the address information reproducing section 91 by the wobble signal reproducing section 11. Then, the address information of the magneto-optical disk 1 is reproduced by the address information reproducing section 91.

It is possible, as described above, to record and reproduce information into/out of the magneto-optical disk with the recording/reproducing clock that is in synchronization with the notch, while reproducing the address information with the wobble signal b in this manner.

Note that the other members of the optical recording/reproducing device shown in FIG. 7 are identical with the members of the optical recording/reproducing device shown in FIG. 2, and description of the functions thereof is omitted.

Since the optical recording/reproducing device configured as above reads out the address information while controlling the rotation with the CAV method, the rotation does not vary depending on seek of the optical pickup 10 and it is possible to access at high speeds.

[Second Embodiment]

Figure 8:
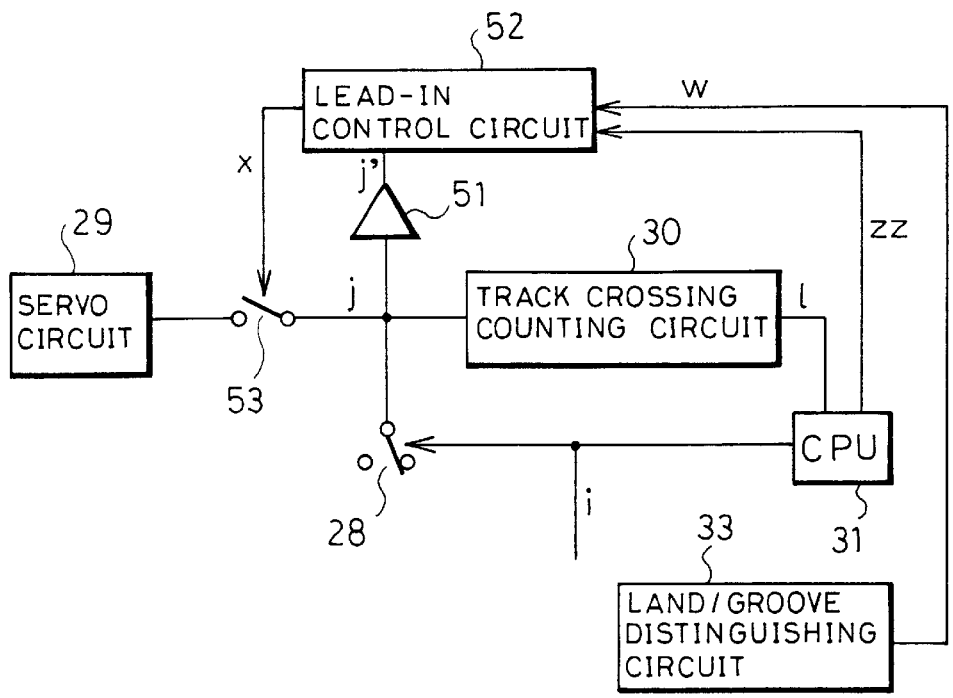
FIG. 8 is a circuit diagram schematically showing a track servo lead-in device of a magneto-optical disk of another embodiment in accordance with the present invention.

The following description will discuss a second embodiment in accordance with the present invention. FIG. 8 shows a variation of the circuit shown in FIG. 3 of the first embodiment, with additional three more members: a comparator 51, a lead-in control circuit 52 and a switching circuit 53. The circuit shown in FIG. 8 is an example of an optical recording/reproducing device for precisely obtaining a lead-in timing of track servo for the land and for the groove. In this manner, the distinguishing of the land and the groove can be used not only for address management, but for a lead-in function of track servo or for a plurality of functions including the lead-in of track servo and the address management. For convenience in description, members of the second embodiment that have the same function as members of the first embodiment are indicated by the same reference numerals and description thereof is omitted.

With the optical recording/reproducing device configured as above, a track error signal j selected by the switching circuit 28 is directed to the comparator 51 and to the switching circuit 53. The comparator 51 outputs a binarized track crossing signal j'. An instruction signal zz from a CPU 31 instructs the lead-in control circuit 52 whether the track servo is to be led in to the land or to the groove. The lead-in control circuit 52, to which the track crossing signal j' and a land/groove distinguishing signal w is inputted, outputs a lead-in timing signal x to the switching circuit 53.

The servo loop is turned ON/OFF by controlling the ON/OFF of the switching circuit 53 with the lead-in timing signal x. It is thereby possible to lead in the track servo either to the land or to the groove in accordance with the land/groove distinguishing signal w.

Figure 9:
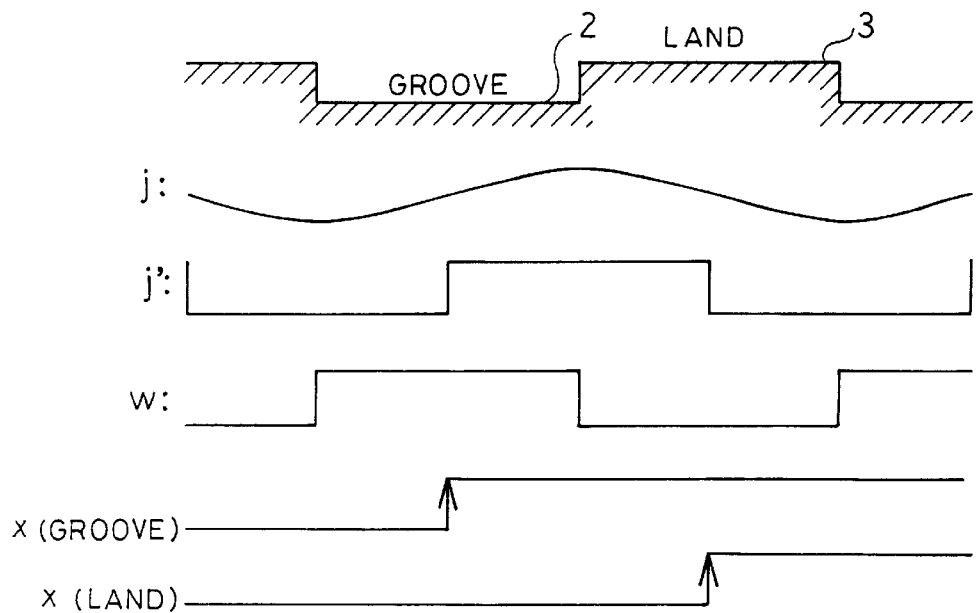
FIG. 9 is an explanatory view showing signal waveforms of the track servo lead-in device shown in FIG. 8.

As shown in FIG. 9, the level of the track error signal j is 0 at the centers of the groove 2 and of the land 3 in a cross-sectional view of the magneto-optical disk 1. The track servo is led in around the centers. The track crossing signal j' is obtained by binarizing the track error signal j.

For example, when the track servo is led in to the groove 2, the lead-in timing signal x is given, in accordance with the instruction signal zz from the CPU 31, at a point where the track crossing signal j' changes from a low level to a high level when the land/groove distinguishing signal w is at a high level, and the track servo is turned ON to be led in to the groove 2. When the track servo is led in to the land 3, the lead-in timing signal x is given in accordance with the instruction signal zz from the CPU 31 when the land/groove distinguishing signal w is at a low level, and the track servo can be thus led in to the land.

In the present embodiment described so far, with the optical recording medium in which the sample bit is stored in synchronization with the wobble signal, the polarity of the wobble signal at the position of the sample bit can be detected by detecting the polarity of the wobble signal at the position of the sample bit, and the land and the groove can be distinguished with this polarity. In this manner, with the land and the groove having a different timing for leading in the track servo, a lead-in timing can be selected, and the track servo can be precisely led in in accordance with a result of the distinguishing between the land and the groove.

Moreover, since the notch 5 of the optical disk shown in FIG. 1 of the aforementioned first embodiment is formed so as to always protrude into the groove 2, there actually exists, by average, a minimal track offset from the land 3 to the groove 2 sandwiching the wobbling sidewall 4. Since the notches only take up 1% along the track, 1% of the protrusion in the radial direction of the optical disk causes an averaged offset.

Incidentally, since the protrusion in this case is less than the track width (>0.7 μm) at largest, the track offset of the magneto-optical disk 1, being less than 0.007 μm at largest, is small enough and ignorable, compared to the recording precision of track.

But, to further improve the frequency precision of the recording/reproducing clock and thereby to perform more precise recording, it is necessary either to increase the number of the notches or to increase the protrusion or the depth of the notch. However, this increases the offset. The third embodiment below can deal with such an offset.

[Third Embodiment]

Figure 10:
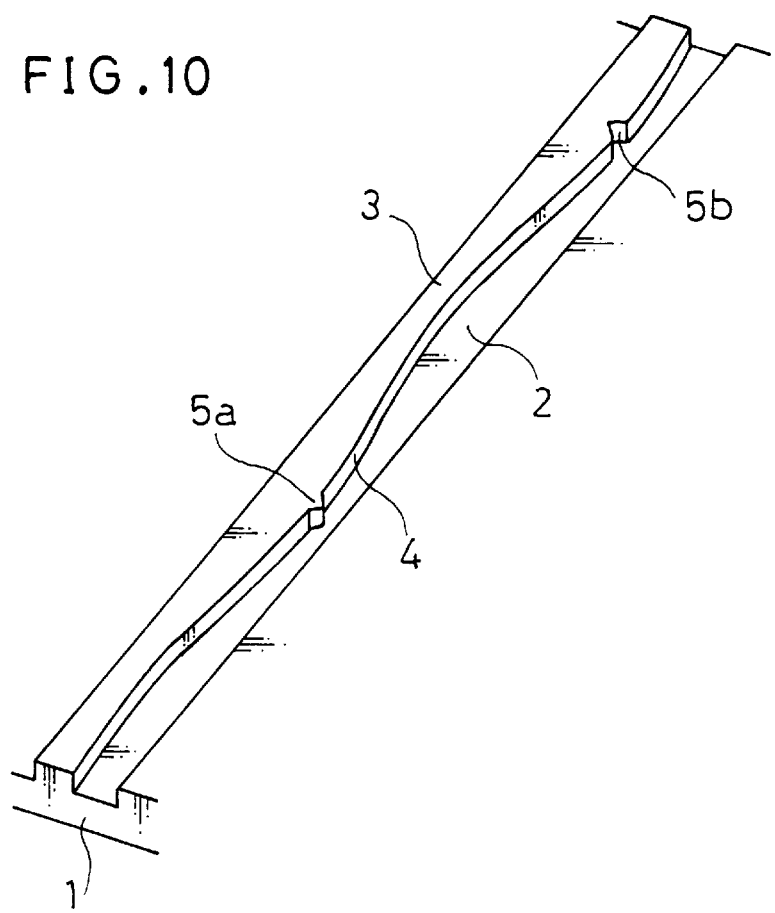
FIG. 10 is a perspective view schematically showing a track shape of a magneto-optical disk of still another embodiment in accordance with the present invention.

The following description will discuss a third embodiment in accordance with the present invention. FIG. 10, showing a track shape of a magneto-optical disk 1, is an example in which the offset given to a track error signal, a wobble signal and the like by a notch of magneto-optical disk 1 is removed.

As shown in FIG. 10, a sidewall 4 sandwiched between a pair of a groove 2 and a land 3 is provided by a wobble signal in advance to the magneto-optical disk 1 of the present embodiment upon manufacture thereof. Notches 5a and 5b of the magneto-optical disk 1 are stored in synchronization with the repetition of the wobbling of the sidewall. One of the notches in the land 3 is the protrusion 5a, and the other notch is the dent 5b. The protrusion and the dent are provided alternately. If the protrusion 5a causes a minimal negative offset to the track error signal, the wobble signal and the like, the dent 5b causes a positive offset.

Since the protrusion 5a and the dent 5b provided alternately in the land 3 as described above, the offsets caused in the track can be cancelled, and the precision in the tracking and the reproducing function of the wobble signal can be further improved.

Figure 11:
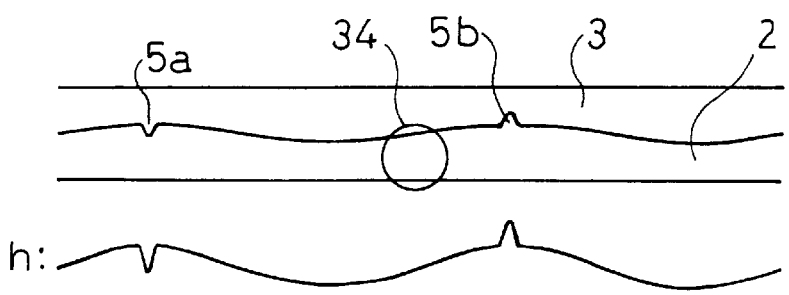
FIG. 11 is an explanatory view showing signal waveforms when the magneto-optical disk shown in FIG. 10 is tracked.

As shown in FIG. 11, a push-pull signal h is reproduced by tracking the groove 2 with a light beam 34. If the protrusion 5a causes a minimal negative offset, the dent 5b causes a positive offset.

Since the protrusion 5a and the dent 5b are provided alternately as described above, the offsets of the protrusion and of the dent can be cancelled by passing a low pass filter, a band pass filter or the like, and the precision in the tracking and the reproducing function of the wobble signal can be further improved. The tracking of the land 3 produces the same results, and therefore description thereof is omitted.

In the present embodiment, since the protrusion 5a and the dent 5b makes a pair for removing the offsets given to the track error signal and the wobble signal as shown in FIG. 10, the offsets are cancelled for every two cycles of the wobbling.

Nevertheless, since the paired protrusion 5a and dent 5b generate a frequency component of half the frequency of the wobble signal, when the wobble signal band and the servo band are not well separated, the frequency component of the notch signal leaks into the servo band and results in a disturbed servo function.

The fourth embodiment below shows examples of an optical recording medium and of an optical recording/reproducing device that can be used even when the wobble signal band and the servo band are not well separated.

[Forth Embodiment]

The following description will discuss a fourth embodiment in accordance with the present invention. FIG. 12 shows a track shape of a magneto-optical disk 1.

As shown in FIG. 12, a notch 54 is stored in the track of the magneto-optical disk 1 of the present embodiment in synchronization with repetition of the wobbling of the sidewall. In other words, the magneto-optical disk 1 is provided with a pair of a protrusion 54a and a dent 54b which form the paired notch 54.

Therefore, if the protrusion 54a generates a minimal positive offset, the adjacent dent 54b generates a negative offset. If the protrusion 54a and the dent 54b are formed in a pair in this manner, the offsets can be cancelled, and the precision in the tracking and the reproducing function of the wobble signal can be further improved.

FIG. 13 shows another example of detecting a sample bit out of a magneto-optical disk shown in FIG. 12. A push-pull signal h is reproduced by tracking the groove 2 with a light beam 34. Since the protrusion 54a and the dent 54b are formed in a pair, the offsets of the protrusion and of the dent can be cancelled by passing a low pass filter, a band pass filter or the like.

Figure 14:
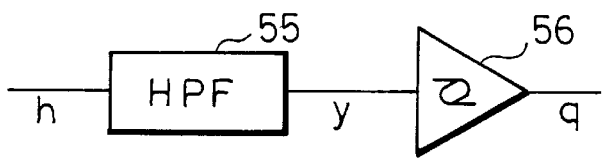
FIG. 14 is a drawing showing a circuit for detecting a sample bit from the magneto-optical disk shown in FIG. 12.

Here shows an example of a circuit for detecting a sample bit g out of the push-pull signal h shown in FIG. 14, which replaces the circuit for detecting the sample bit g out of the total signal in FIG. 3 of the first embodiment.

A sample bit signal y, having a waveform shown in FIG. 13, is obtained by passing the push-pull signal h through a high pass filter 55. The sample bit g is obtained by inputting the sample bit signal y to a hysteresis comparator 56 shown in FIG. 14. Thereafter, for example, the land and the groove can be distinguished, and the recording/reproducing clock can be generated with the wobble signal b and the sample bit g in the same manner as the previous embodiments. The tracking of the land 3 produces the same results, and therefore description thereof is omitted.

As described above, the present embodiment can make it possible to remove a track offset even when the wobble signal band and the servo band are not well separated.

Nevertheless, since, in FIG. 12, the protrusion 54a is formed where the groove 2 is the narrowest, the protrusion 54a is too near to an opposite land therefrom. As a result, cross talk of a notch signal may happen.

Therefore, the fifth embodiment below explains an example of preventing the cross talk of the notch signal.

[Fifth Embodiment]

Figure 15:
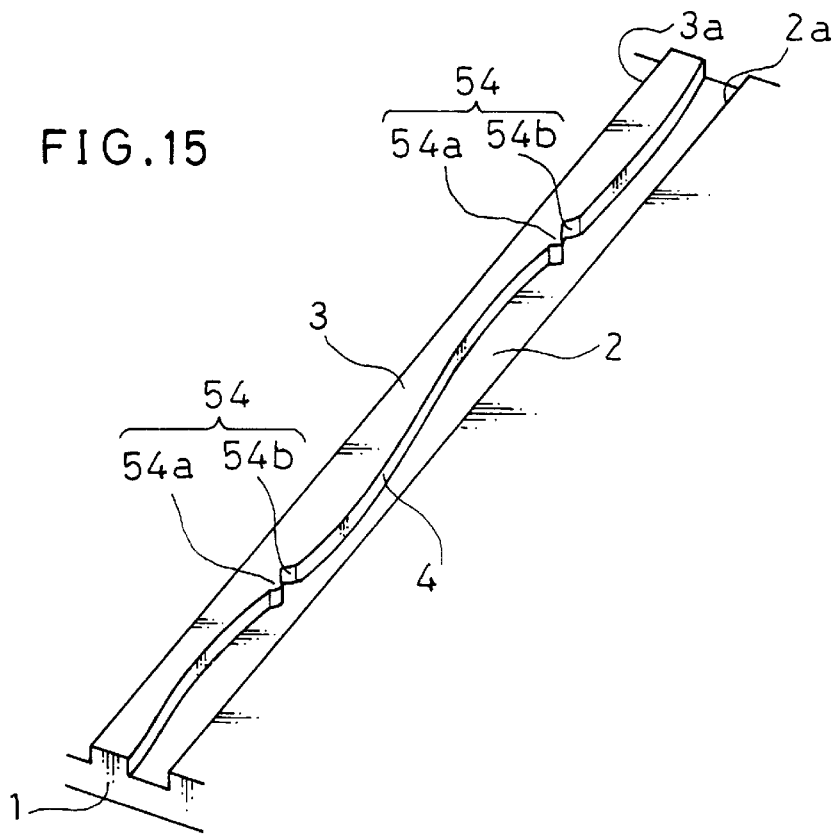
FIG. 15 is a perspective view schematically showing a track shape of a magneto-optical disk of yet another embodiment in accordance with the present invention.

The following description will discuss a fifth embodiment in accordance with the present invention. As shown in FIG. 15, a magneto-optical disk 1 of the present embodiment is provided with a notch 54 (a protrusion 54a and a dent 54b) where the land 3 and the groove 2 have the equal width. This configuration makes equal the distances from the protrusion 54a and the dent 54b to the respective sidewalls 2a and 3a, and thereby can most reduce cross talk between notch signals. In addition, as described above, the amplitude of the notch 54 is made larger than the amplitude of the wobbling, and the signal quantity read out of the notch 54 can be prevented from reducing.

Figure 16:
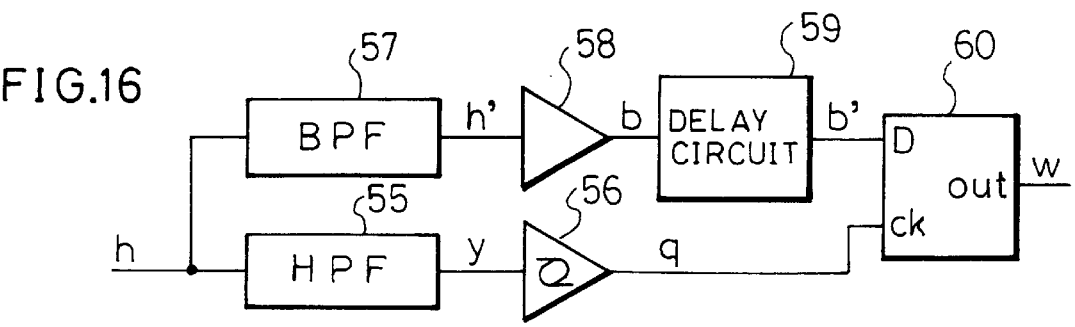
FIG. 16 is a drawing showing a circuit for distinguishing the land and the groove of the magneto-optical disk shown in FIG. 15.

FIG. 16 shows another circuit for distinguishing the land and the groove of the magneto-optical disk 1 shown in FIG. 15. This circuit obtains a sample bit signal y by passing a push-pull signal h through a high pass filter 55, and obtains a sample bit g by inputting the sample bit signal y to a hysteresis comparator 56.

The push-pull signal h passes a band pass filter 57 and thus becomes a wobble signal b binarized by a comparator 58. The wobble signal b passes a delay circuit 59, and then is inputted to a D-type flip flop 60 at the D input terminal thereof.

The D-type flip flop 60 distinguishes the land and the groove by capturing with the sample bit g a wobble signal b' delayed by the delay circuit 59.

Figure 17A:
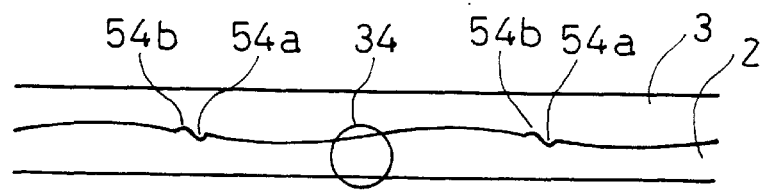
FIG. 17(a) is an explanatory drawing showing signal waveforms when the groove of the magneto-optical disk is tracked with a circuit shown in FIG. 16.

FIG. 17(a) shows signal waveforms with the circuit shown in FIG. 16. A push-pull signal h is reproduced by tracking a groove 2 with a light beam 34. Note that since the protrusion 54a and the dent 54b are made in a pair, the offsets of the protrusion and of the dent can be cancelled by passing a low pass filter, a band pass filter or the like. A sample bit signal y, having a waveform as shown in FIG. 17(a), is obtained by passing the push-pull signal h through a high pass filter 55 shown in FIG. 16. The sample bit g is obtained by inputting the sample bit signal y to a hysteresis comparator 56 shown in FIG. 16.

FIG. 17(a) shows that the land/groove distinguishing signal is high if a wobble signa b' delayed by passing a binarized wobble signal b shown in FIG. 16 through the delay circuit 59 is captured with the sample bit g.

Figure 17B:
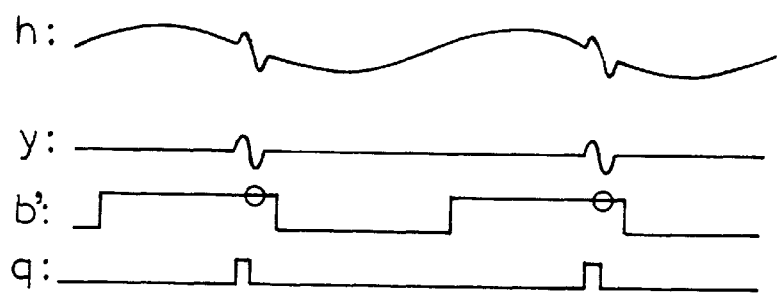
FIG. 17(b) is an explanatory drawing showing signal waveforms when the land of the magneto-optical disk is tracked with a circuit shown in FIG. 16.

FIG. 17(b) shows waveforms when the land 3 is tracked. FIG. 17 shows that the land/groove distinguishing signal becomes low by capturing the delayed wobble signal b' with the sample bit g. Therefore, even if the notch 54 is formed where the land 3 and the groove 2 have an equal width, the land 3 and the groove 2 can still be distinguished.

If the notch 54 (the protrusion 54a and the dent 54b) is formed where the land 3 and the groove 2 have an equal width in this manner, the distances are equal from the protrusion 54a and the dent 54b to the respective sidewalls 2a and 3a, and the cross talk can be most reduced between notch signals.

Figure 6:
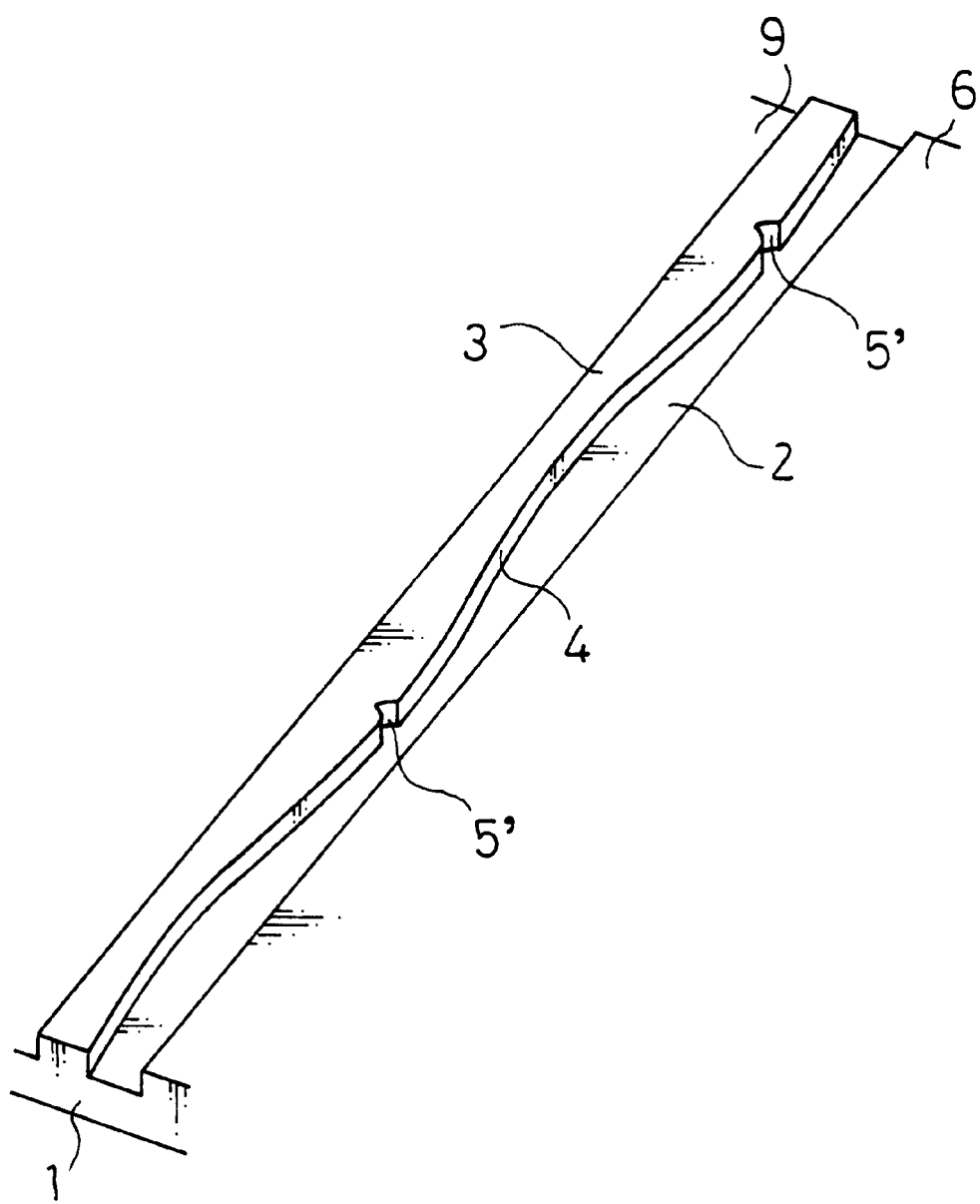
FIG. 6 is a perspective view schematically showing a track shape of another magneto-optical disk in accordance with the present invention.

Note that the notches shown in FIGS. 12 and 15, since doubling the amplitude of the detection signal, produce better signal-to-noise ratios than the notches shown in FIGS. 1, 6 and 10. Moreover, the same signal amplitude can be detected when the land 3 is tracked and when the groove 2 is tracked.

[Sixth Embodiment]

The following description will discuss a sixth embodiment in accordance with the present invention. The present embodiment is an example of inputting double the sample bits to a PLL by doubling the number of the notches in an attempt to realize high speed lead-in and to reduce jitter of a recording/reproducing clock.

Figure 18:
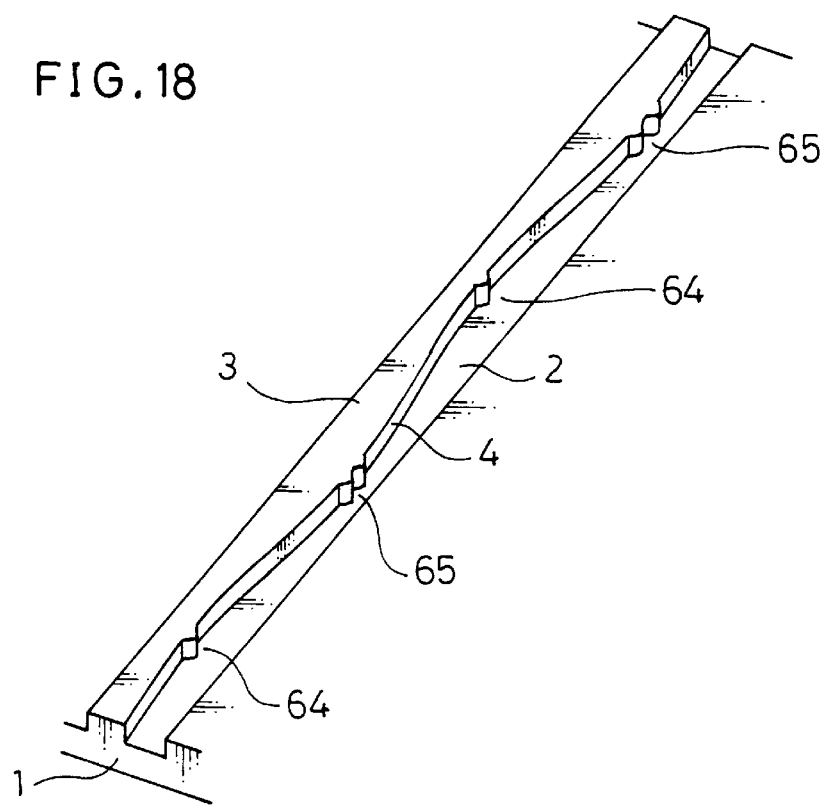
FIG. 18 is a perspective view schematically showing a track shape of a magneto-optical disk of still another embodiment in accordance with the present invention.

To double the number of the notches, as shown in FIG. 18, a notch 65 is formed where the land 3 of the magneto-optical disk 1 is the widest, and a notch 64 is formed where the land 3 of the magneto-optical disk 1 is the narrowest. The notch 65 is made up of two notches adjacent to each other. This configuration enables the land 3 and the groove 2 to be surely distinguished from each other. This pattern, composed of two kinds of notches, improves the function for detecting a sample bit out of the notch 65.

Figure 19:
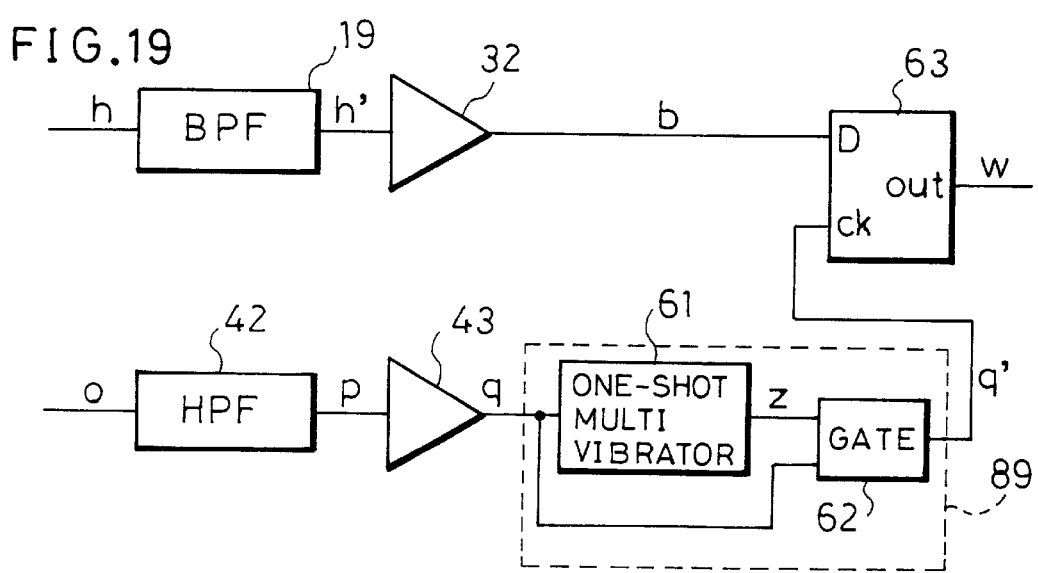
FIG. 19 is a drawing showing a circuit for distinguishing the land and the groove of the magneto-optical disk shown in FIG. 18.

FIG. 19 shows an example of a circuit for distinguishing the land and the groove of the magneto-optical disk 1.

A push-pull signal h is passed through a band pass filter 19 and binarized by a comparator 32. A wobble signal b is inputted to a D-type flip flop 63 at the D input terminal thereof.

A total signal o is passed through a high pass filter 42 and thus binarized by a comparator 43. The sample bit g is obtained in this manner. The sample bit g is inputted to a pattern detecting circuit 89 (pattern detecting means) composed of a one-shot multi vibrator 61 and a gate circuit 62. The one-shot multi vibrator 61 outputs a gate signal z. When the gate signal z is low, the sample bit g is inputted to the gate circuit 62, which in turn generates and inputs a sample bit g' to the D-type flip flop 63 at the ck input terminal thereof.

The D-type flip flop 63 distinguishes the land and the groove by capturing a wobble signal b with the sample bit g' which has been pattern-detected.

Figure 20:
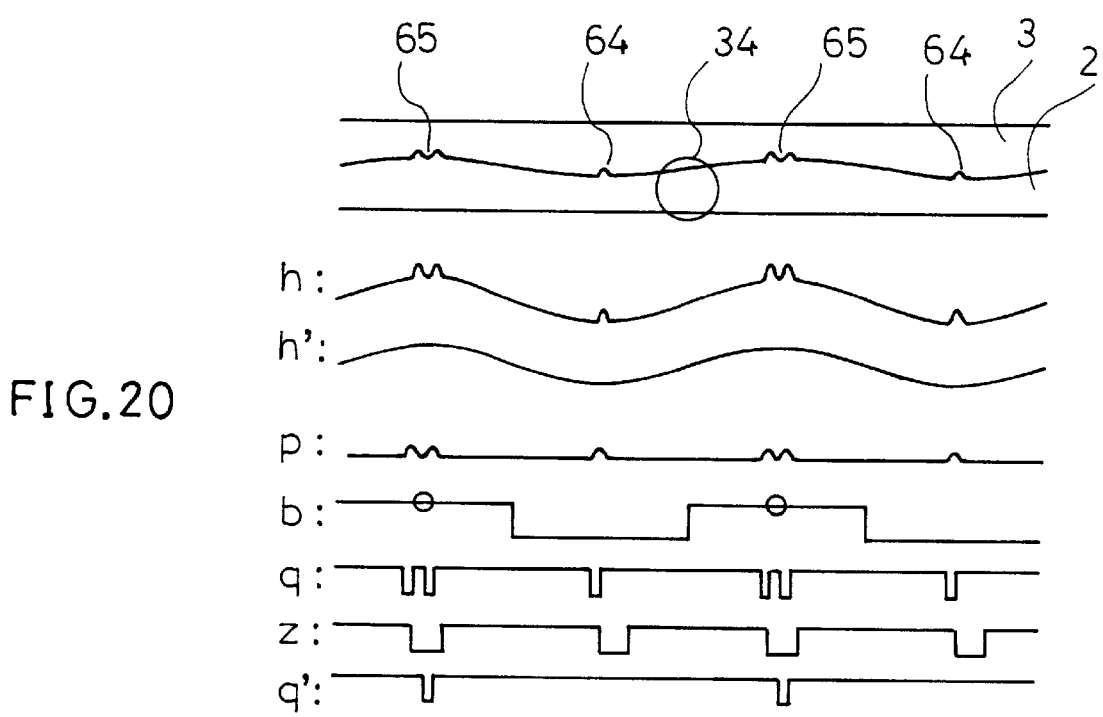
FIG. 20 is an explanatory drawing showing signal waveforms when the magneto-optical disk shown in FIG. 18 is tracked.

FIG. 20 shows waveforms in FIG. 19. The push-pull signal h is reproduced by tracking the groove 2 with a light beam 34. A sample bit signal p is obtained by passing the push-pull signal h through the high pass filter 55 shown in FIG. 19. A sample bit g is obtained by binarizing the sample bit signal p with a comparator 43 shown in FIG. 19. Here, the notch 65 generates two pulses, and the notch 64 generates one pulse.

The sample bit g is inputted to the one-shot multi vibrator 61, which in turn outputs the gate signal z. The gate circuit 62 passes the sample bit g when the gate signal z is low. The gated sample bit g' is a signal having detected only the notch 65, and the notch 64 is not detected. Moreover, wrong detection such as noise can also be prevented by patterning in this manner.

Therefore, by capturing the wobble signal b with the sample bit g', the land and the groove can be surely distinguished. Besides, the positions of the sample bits can be increased, and the notch can be made larger in an attempt to realize high speed lead-in and to reduce jitter of a recording/reproducing clock.

Note also that if only the sample bit g' out of the pattern of the notch 65 is inputted to the PLL 44 shown in FIG. 3, a recording/reproducing clock that is free from, for example, noise and thus stable can be obtained.

Moreover, the pattern of the notch 65 is composed of a plurality of protrusions. Alternatively, a protrusion 54a and a dent 54b may be combined in plural to form the notch 65 as shown in FIGS. 12 and 15.

[Seventh Embodiment]

Figure 21:
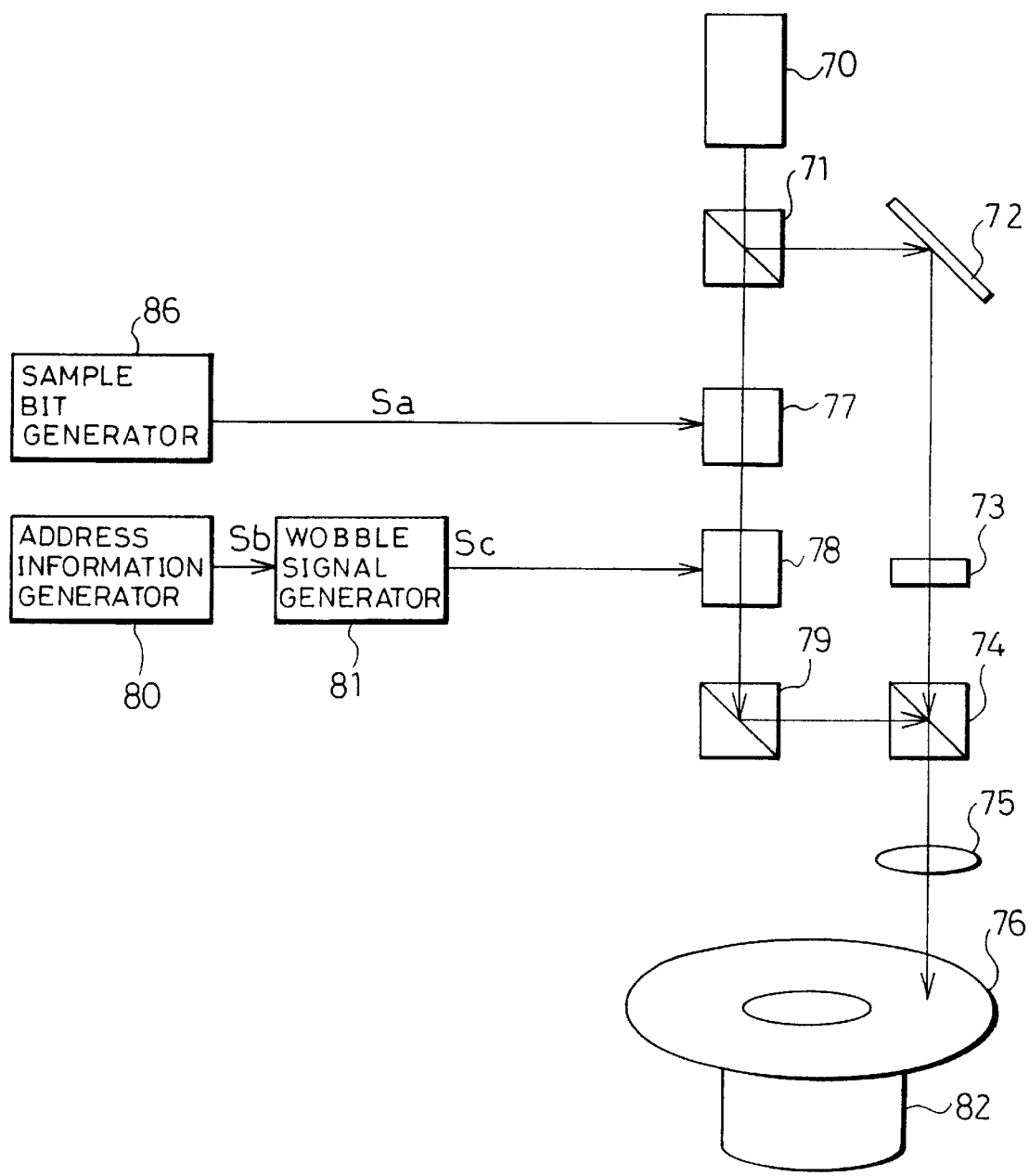
FIG. 21 is a schematic block diagram showing an example of a magneto-optical disk manufacturing device in accordance with the present invention.

The following description will discuss a seventh embodiment in accordance with the present invention. FIG. 21 shows a main part of a cutting device (a magneto-optical disk manufacturing device) for cutting the track of a magneto-optical disk 1. In other words, the present embodiment explains a manufacturing method of a magneto-optical disk 1, i.e., an optical recording medium in accordance with the present invention.

The cutting device is composed of a laser light source 70, a beam splitter 71, a reflection mirror 72, a half-wave plate 73, a polarization prism 74, an objective lens 75, a light modulator 77, a light polarizer 78, a reflection mirror 79, an address information generator 80, a wobble signal generator 81, and a sample bit generator 86.

The address information generator 80 generates address information of the track.

The wobble signal generator (wobble signal generating means) 81 generates a wobble signal to be stored in a sidewall of the groove that wobbles in accordance with the address information.

The sample bit generator (notch signal generating means) 86 generates a notch signal for storing a notch bit of the track having a different frequency from the wobble signal.

That is, with the cutting device configured as above, a light beam radiated from the laser light source 70 is divided into two by the beam splitter 71.

Figure 22:
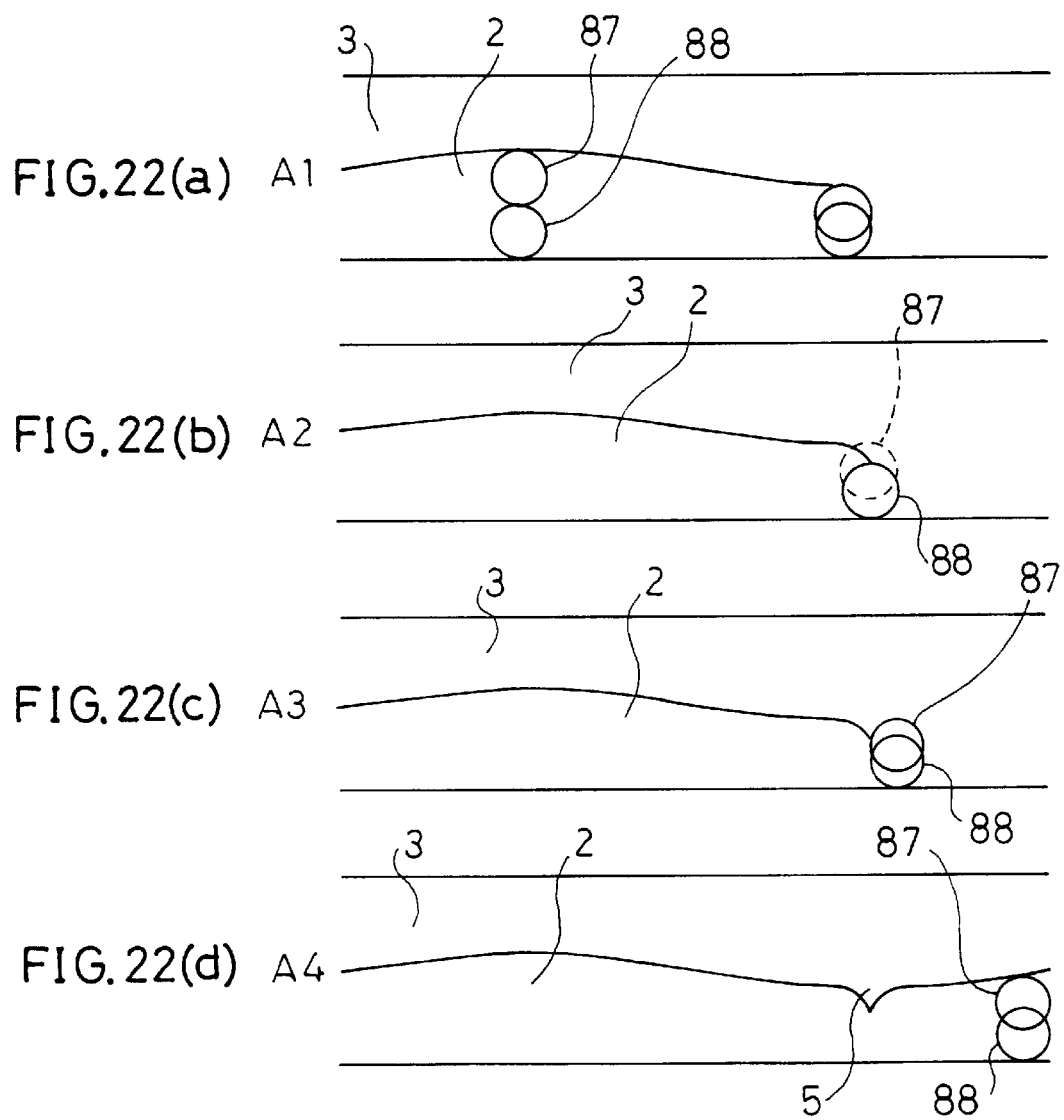
FIGS. 22(a) through 22(d) are explanatory drawings showing an example of cutting processes of a track of a magneto-optical disk manufactured with the magneto-optical disk manufacturing device showing in FIG. 21.
Figure 23:
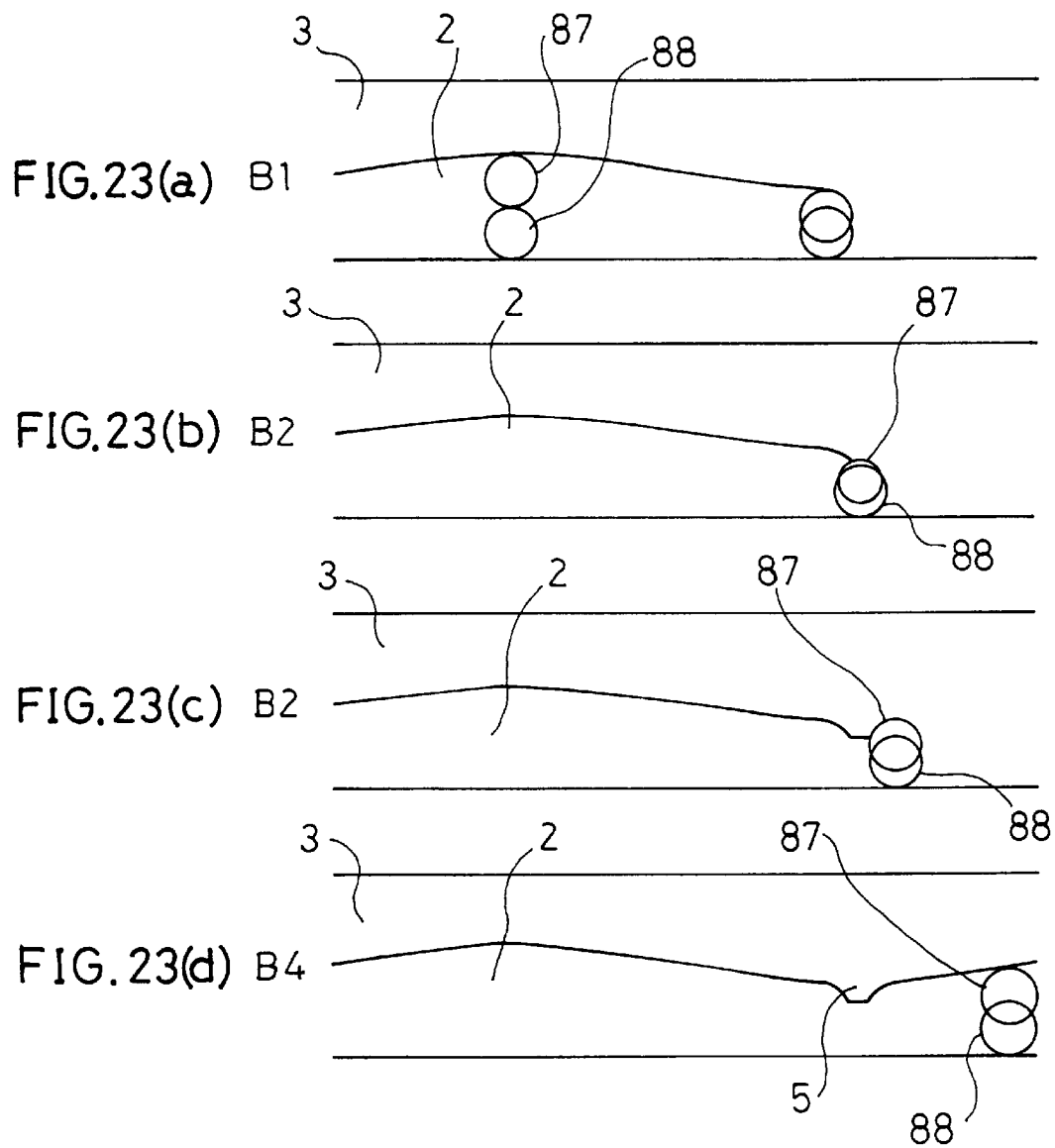
FIGS. 23(a) through 23(d) are explanatory drawings showing another example of cutting processes of a track of a magneto-optical disk manufactured with the magneto-optical disk manufacturing device showing in FIG. 21.

One of the splitted light beams is reflected by the reflection mirror 72, and then turned by 90 degrees with respect to the polarization direction thereof by the half-wave plate 73. That splitted light beam passes the polarization prism 74, is converged by the objective lens 75, and radiated at photoresist applied in advance to an optical disk substrate 76. The splitted light beam is for cutting a non-wobbling sidewall, i.e., a light beam 88 (to be described later in detail, see FIGS. 22 and 23).

The other splitted light beam is turned ON/OFF, or light quantity thereof is switched by the light modulator 77 as light quantity switching means for switching light quantity, in accordance with a signal sa outputted from the sample bit generator 86. That is, the sample bit generator 83 can adjust a switching time or switching light quantity of the light beam. In addition, the sample bit generator 83 is designed to form a notch bit by adjusting the light quantity in this manner.

Thereafter, the light beam is wobbled by the light polarizer (light beam wobbling means) 78. That is, the wobble signal generator 81 FM-modulates a carrier signal with address information sb outputted from the address information generator 80, and a wobble signal sc is sent to the light polarizer 78. The wobbling light beam is reflected by the reflection mirror 79, added to the other light beam by the polarization prism 74, and radiated at the photoresist on the optical disk substrate. This light beam is a light beam for cutting the wobbling sidewall, i.e., a later-mentioned light beam 87 (see FIGS. 22 and 23).

Then, these two light beams are radiated at the optical disk substrate 76 rotated by a rotation base 82. The photoresist is exposed to light in this manner. Thereafter, the photoresist is developed, and unnecessary resist is removed. The remaining resist is etched to form a track on the optical disk substrate 76.

FIGS. 22(a) through 22(d) show cutting processes of a magneto-optical disk manufactured with the aforementioned cutting device. The land 3 and the groove 2 of the magneto-optical disk are formed in these processes.

First, as shown FIG. 22(a), in the process A1, cutting is performed with the wobbling light beam 87 and the non-wobbling light beam 88.

Next, as shown in FIG. 22(b), in the process A2, the light beam 87 is turned OFF, thereby starting storing of notch portions.

Then, as shown in FIG. 22(c), in the process A3, the light beam 87 is turned ON again after a certain period of time, thereby completing the storing of notch portions.

Finally, as shown in FIG. 22(d), in the process A4, cutting is performed with the wobbling light beam 87 again. In this method, the length and depth of the notch 5 can be adjusted with the OFF time of the light beam 87.

FIGS. 23(a) and 23(d) show other cutting processes of a magneto-optical disk manufactured with the aforementioned cutting device.

First, as shown in FIG. 23(a), in the process B1, cutting is performed with the wobbling light beam 87 and the non-wobbling light beam 88.

Next, as shown in FIG. 23(b), in the process B2, the light quantity of the light beam 87 is reduced, thereby starting storing of notch portions.

Then, as shown in FIG. 23(c), in the process B3, the light quantity of the light beam is raised back to the original light quantity after a certain period of time, thereby completing the storing of notch portions.

Finally, as shown in FIG. 23(d), in the process B4, cutting is performed with the wobbling light beam 87 again. In this method, the length of the notch 5 can be adjusted with the time during which the light quantity of the light beam 87 is reduced. The depth of the notch 5 can be adjusted with the light quantity by which the light quantity of the light beam 87 is reduced.

According to the manufacturing methods of the magneto-optical disk of the present embodiment, it is possible to store the notch only on the wobbling sidewall by cutting the non-wobbling sidewall with the first light beam (the light beam 87), cutting the wobbling sidewall with the second light beam (the light beam 88), and switching the light quantity of the second light beam at a place where the sample bit is stored.

Moreover, since the depth of the notch, measured perpendicularly to the track, can be adjusted in accordance with the light quantity of the second light beam that is switched at the notch portion, a notch shape that is free from cross talk can be easily stored. Besides, the depth of the notch, measured perpendicularly to the track, can be adjusted by using the circular shape of the light beam in accordance with the switching time of the second light beam that is switched at the notch portion, and a notch shape that is free from cross talk can be easily stored.

[Eighth Embodiment]

Figure 24:
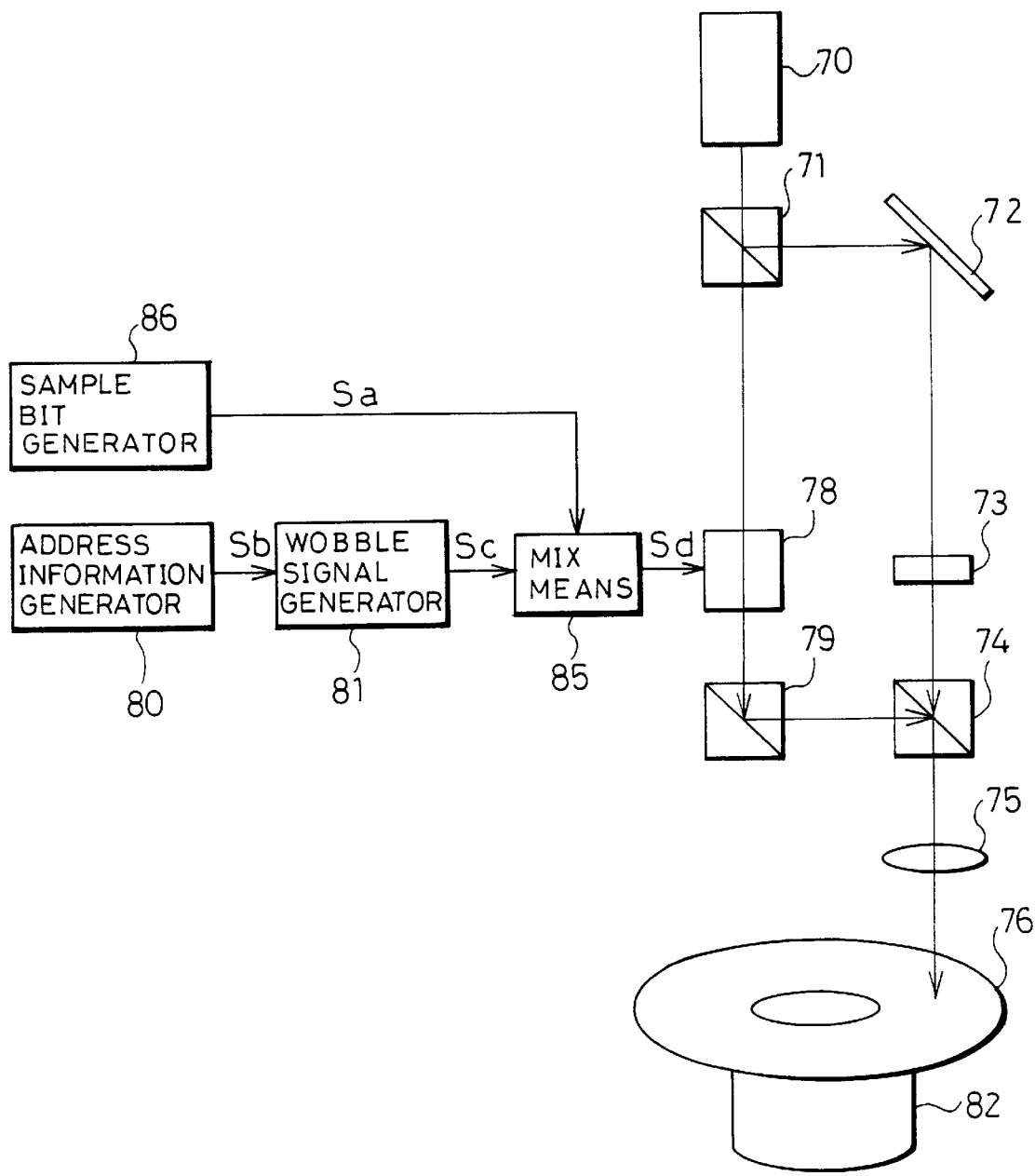
FIG. 24 is a block diagram schematically showing another example of a magneto-optical disk manufacturing device in accordance with the present invention.

The following description will discuss an eighth embodiment in accordance with the present invention. FIG. 24 schematically shows another configuration example of a cutting device for cutting the track of the magneto-optical disk 1.

The light modulator 77 of the cutting device shown in FIG. 21 of the seventh embodiment is not provided to the cutting device of the present embodiment, which instead includes mix means 85 between a wobble signal generator 81 and a light polarizer 78. In other words, the cutting device of the present embodiment is configured so that a sample bit signal sa from a sample bit generator 86 is inputted to the mix means 85, instead of being inputted to the light modulator 77 of the cutting device shown in FIG. 21.

The cutting device, in the same manner as the cutting device of the first embodiment, splits a light beam radiated from the laser light source 70 into two with a beam splitter 71.

One of the splitted light beam is reflected by a reflection mirror 72, and then turned by 90 degrees with respect to the polarization direction thereof by a half-wave plate 73. That splitted light beam passes the polarization prism 74, is converged by the objective lens 75, and radiated at photoresist applied in advance to an optical disk substrate 76. The splitted light beam is for cutting a non-wobbling sidewall (i.e., a light beam 88 shown in FIGS. 22 and 23).

The other splitted light beam is wobbled by the light polarizer (light beam wobbling means) 78. The sample bit generator 86 inputs the sample bit signal sa to the mix means 85 at one of the input terminals thereof. The wobble signal generator 81 FM-modulates a carrier signal with address information sb outputted from the address information generator 80, and a wobble signal sc is inputted to the mix means 85 at the other input terminal thereof.

The sample bit sa and the wobble signal sc are mixed by the mix means 85, and sent to the light polarizer 78. In this manner, the sample bit signal can also be stored with the wobbling of the light beam. The wobbling light beam is turned towards the polarization prism 74 by the reflection mirror 79, and radiated at photoresist on the optical disk substrate 76. This light beam is for cutting the wobbling sidewall (i.e., a light beam 87 shown in FIGS. 23 and 23).

Then, these two light beams are radiated at the optical disk substrate 76 rotated by a rotation base 82. The photoresist is exposed to light in this manner. Thereafter, the photoresist is developed, and unnecessary resist is removed. The remaining resist is etched to form a track on the optical disk substrate 76.

According to the manufacturing methods of the magneto-optical disk of the present embodiment, it is possible to store the notch only on the wobbling sidewall by cutting the non-wobbling sidewall with the first light beam (the light beam 87), cutting the wobbling sidewall with the second light beam (the light beam 88), and wobbling the second light beam at a higher frequency than the normal cutting frequency at a place where the sample bit is stored.

The above embodiments have discussed a case where both the land and the groove are used as a track for recording information. However, the present invention is not limited to this. Alternatively, the present invention can also be applied to a case where information is recorded either in the land or in the groove. The ninth embodiment below will discuss such a case where information is recorded either in the land or in the groove.

[Ninth Embodiment]

The following description will discuss a ninth embodiment in accordance with the present invention. For convenience in description, members of the present embodiment that have the same function as members of the above embodiments are indicated by the same reference numerals and description thereof is omitted.

Figure 25:
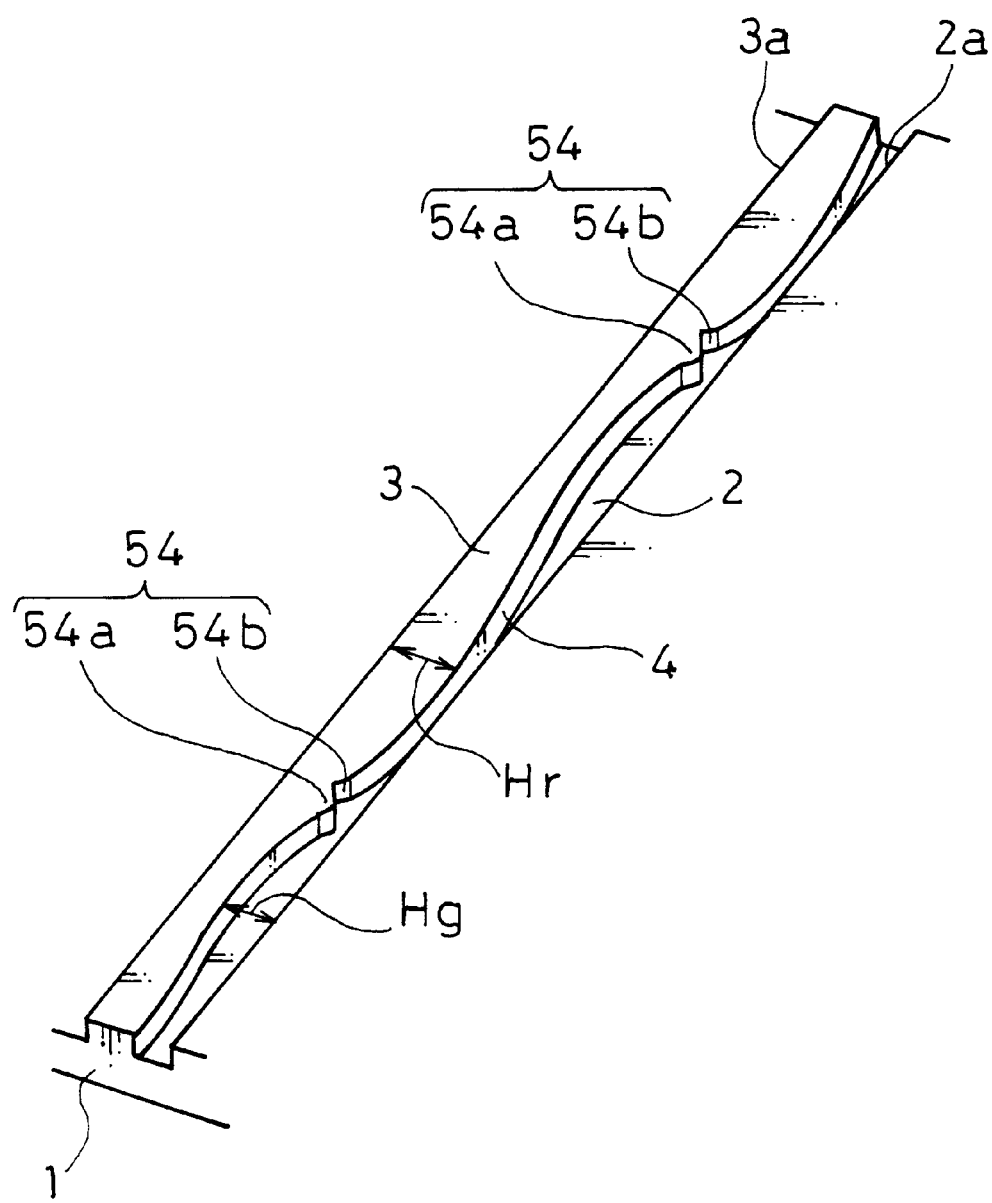
FIG. 25 is a perspective view schematically showing a track shape of a magneto-optical disk of a further embodiment in accordance with the present invention.

First, it is assumed that information is recorded only in a land 3. In this case, as shown in FIG. 25, a magneto-optical disk 1 is configured so that a notch 54 formed by a pair of a protrusion 54a and a dent 54b is formed on a sidewall 4. This is the same configuration as that of the magneto-optical disk 1 of the fifth embodiment shown in FIG. 15. However, the magneto-optical disk 1 shown in FIG. 15 records information both in the land 3 and in the groove 2, whereas the magneto-optical disk 1 of the present embodiment records information only in the land 3.

In the magneto-optical disk 1 of the present embodiment 1, the groove 2 is cut so as to be narrower than the land 3 as shown in FIG. 25. For example, the groove 2 is cut so as to have a maximum width Hg which is smaller than the maximum width Hr of the land 3. This increases information tracks in number. An improvement in recording density is thus attempted.

Here, the number of the information tracks can be increased by reducing the width of the groove 2, as long as a tracking to the land 3 is possible.

Figure 26:
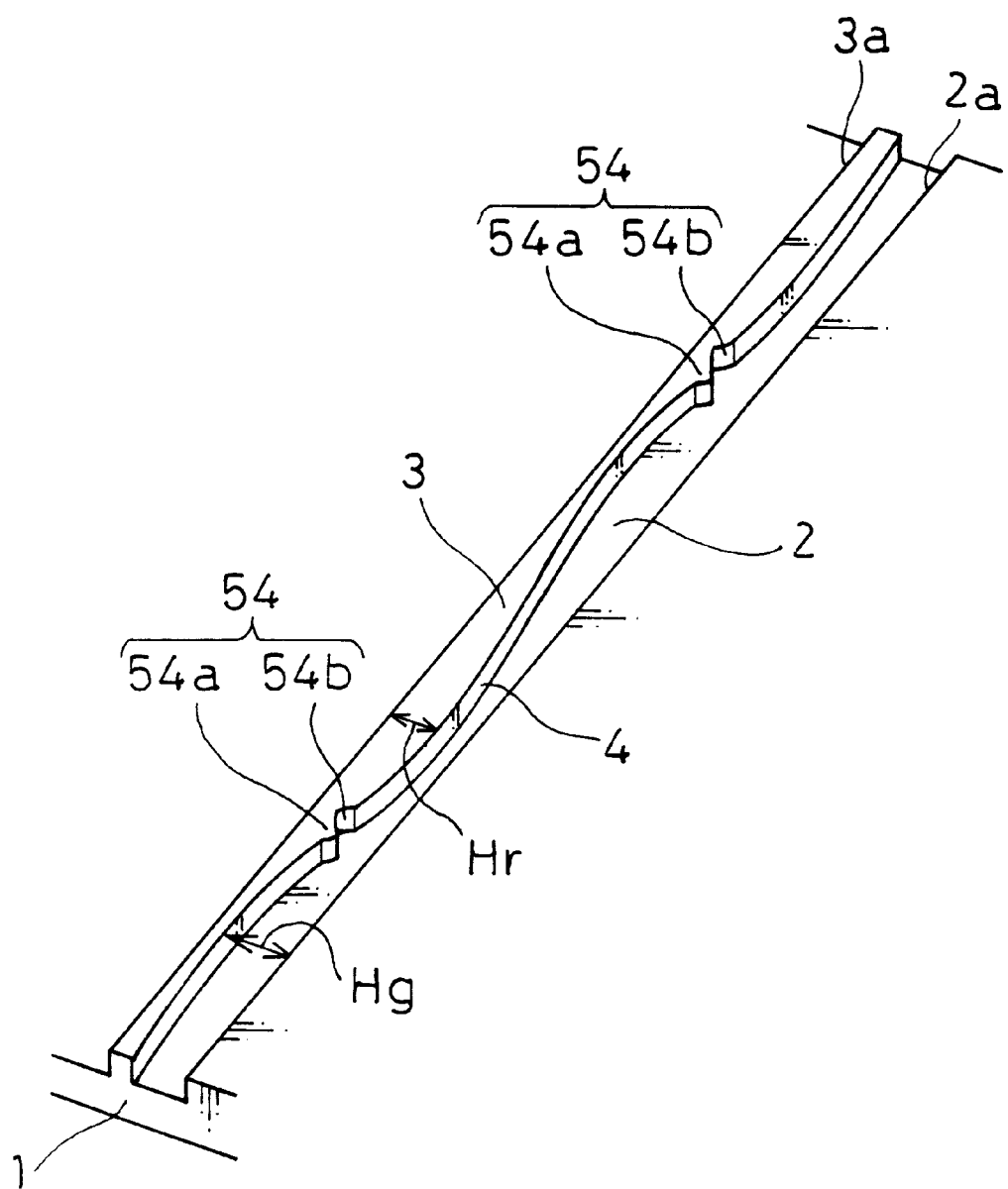
FIG. 26 is a perspective view schematically showing a track shape of a magneto-optical disk of the further embodiment in accordance with the present invention.
Figure 27:
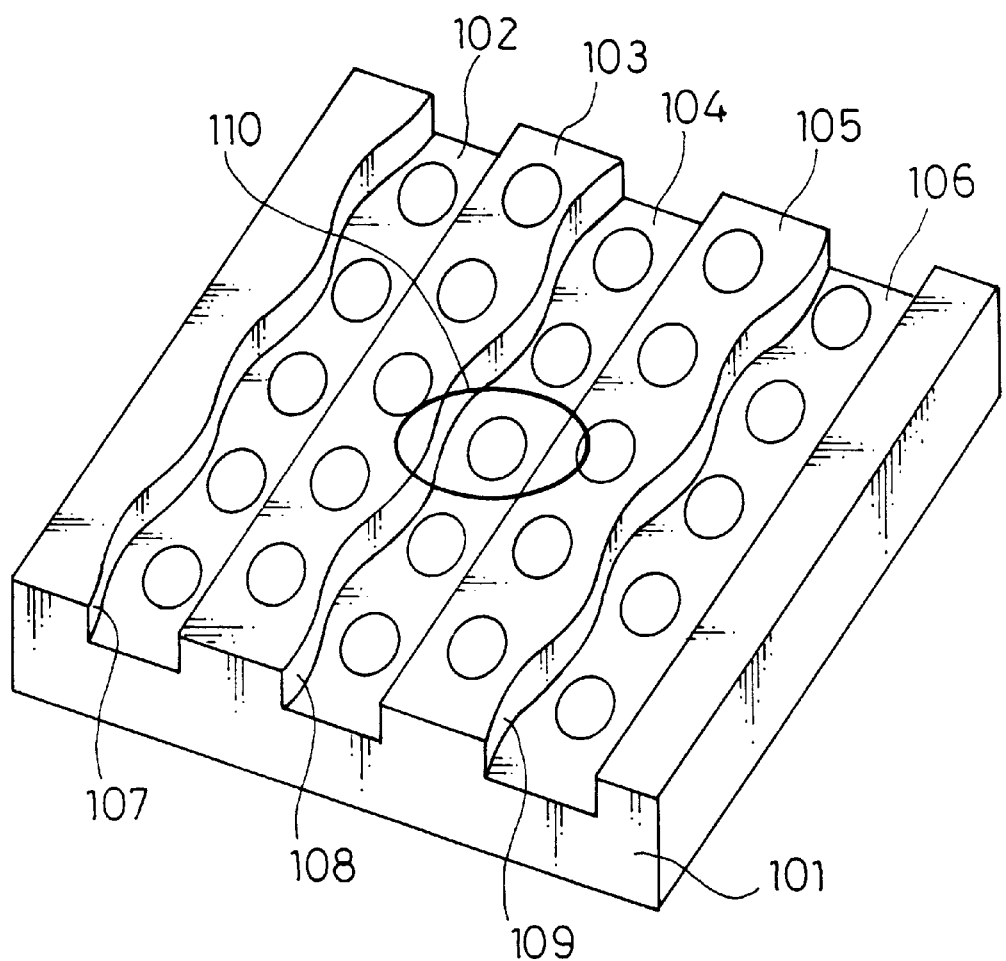
FIG. 27 is a perspective view schematically showing an optical disk provided with a conventional one-side wobbling track.
Figure 28:
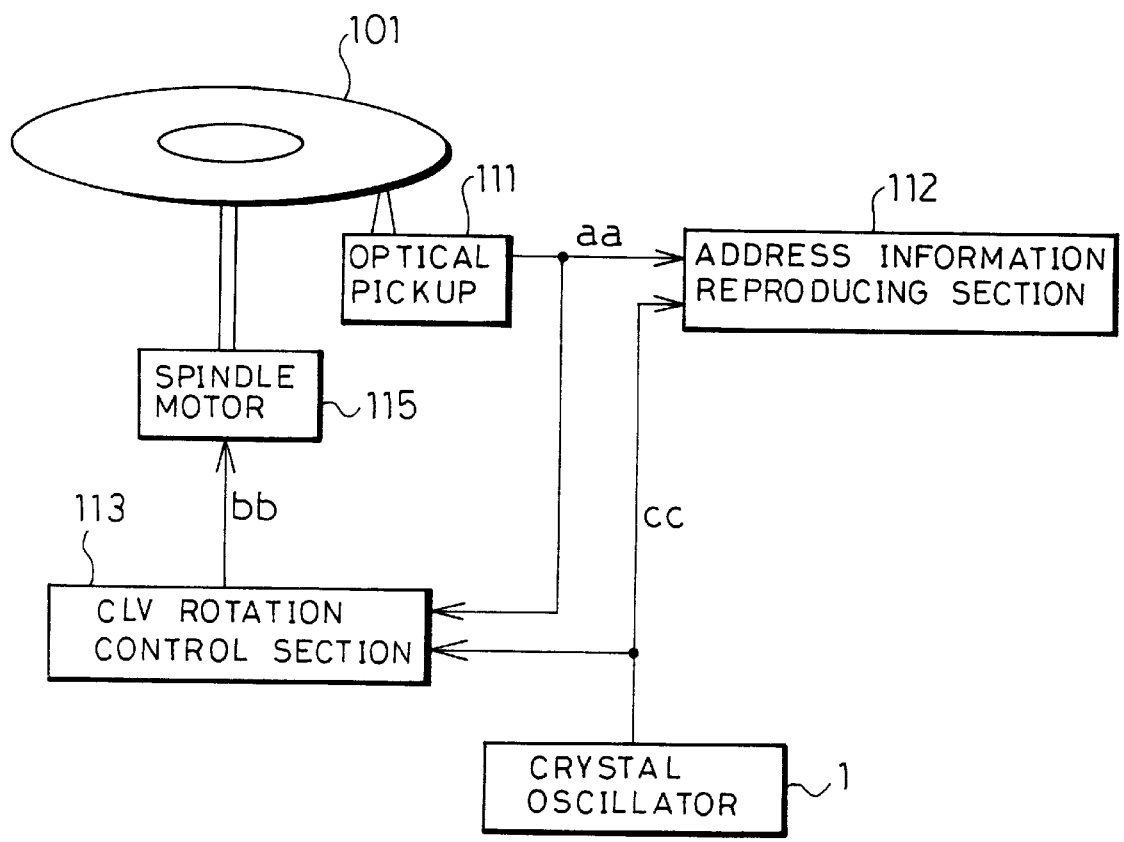
FIG. 28 is a block diagram schematically showing a configuration of a conventional magneto-optical recording/reproducing device.

Next, it is assumed that information is recorded only in the groove 2. In this case, as shown in FIG. 26, a magneto-optical disk 1 is configured so that a notch 54 formed by a pair of a protrusion 54a and a dent 54b is formed on a sidewall 4. This is the same configuration as that of the magneto-optical disk 1 shown in FIG. 25. However, the groove 2 is cut so as to be narrower than the land 3 in the magneto-optical disk 1 shown in FIG. 25, whereas the land 3 is cut so as to be narrower than the groove 2 in the magneto-optical disk 1 shown in FIG. 26. For example, the land 3 is cut so as to have a maximum width Hr which is smaller than the maximum width Hg of the groove 2. This increases information tracks in number. An improvement in recording density is thus attempted.

Here, the number of the information tracks can be increased by reducing the width of the land 3, as long as a tracking to the groove 2 is possible.

Note that a magneto-optical disk has been used as an example in the above embodiments. However, the embodiments may be also applied to a write once type optical disk and a rewritable optical disk of a phase change type. Besides, the embodiments can be applied not only to a recording medium of a disk shape, but also to that of a different shape, such as a card shape and a drum shape.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical recording/reproducing device for recording/reproducing information into/out of an optical recording medium that has a track, one of the sidewalls of the track wobbling, and that is provided with a notch bit in the track having a different frequency from a wobble signal read out of the wobbling of the sidewall of the track, the optical recording/reproducing device comprising:
  recording medium drive control means for controlling a relative velocity between the optical recording medium and a light beam in accordance with the wobble signal reproduced out of the track;
  reference signal extracting means for extracting a reference signal out of the notch bit of the track;
  recording/reproducing clock generating means, to which the reference signal is inputted, for generating a recording/reproducing clock synchronizing with the reference signal; and
  recording/reproducing means for synchronizing a recording position of a bit for recording information with a position of the notch bit, and for thus recording/reproducing information in accordance with the recording/reproducing clock.

2. The optical recording/reproducing device defined as in claim 1, further comprising:
  information recording means for recording information in an area that does not include the notch bit.

3. An optical recording/reproducing device for recording/reproducing information into/out of an optical recording medium that has a track, one of the sidewalls of the track wobbling in accordance with either rotation synchronization information or address information, or both, and that is provided with a notch bit of the track on the one of the sidewalls of the track at a different frequency from a wobble signal read out of the wobbling of the sidewall of the track, the optical recording/reproducing device comprising:
  address information reproducing means for reproducing address information in accordance with the wobble signal reproduced out of the track;
  reference signal extracting means for extracting a reference signal out of the notch bit;
  recording/reproducing clock generating means, to which the reference signal is inputted, for generating a recording/reproducing clock synchronizing with the reference signal; and
  recording/reproducing means for synchronizing a recording position of a bit for recording information with a position of the notch bit, and for thus recording/reproducing information in accordance with the recording/reproducing clock.

4. An optical recording/reproducing device for recording/reproducing information into/out of an optical recording medium that has a track, one of the sidewalls of the track wobbling, and that is provided with a notch bit of the track on the one of the sidewalls of the track at a different frequency from a wobble signal read out of the wobbling of the sidewall of the track, wherein the notch bit is composed of a plurality of continuous notches, the optical recording/reproducing device comprising:
  pattern detecitng means for detecting a notch pattern of the notch bit;
  recording medium drive control means for controlling a relative velocity between the optical recording medium and a light beam in accordance with the wobble signal reproduced out of the track;
  reference signal extracting means for extracting a reference signal out of the notch bit;
  recording/reproducing clock generating means, to which the reference signal is inputted, for generating a recording/reproducing clock synchronizing with the reference signal; and
  recording/reproducing means for synchronizing a recording position of a bit for recording information with a position of the notch bit, and for thus recording/reproducing information in accordance with the recording/reproducing clock.

5. An optical recording/reproducing device for recording/reproducing information into/out of an optical recording medium that has a track, one of the sidewalls of the track wobbling in accordance with either rotation synchronization information or address information, or both, and that is provided with a notch bit of the track on the one of the sidewalls of the track at a different frequency from a wobble signal read out of the wobbling of the sidewall of the track, wherein the notch bit is composed of a plurality of continuous notches, the optical recording/reproducing device comprising:
  pattern detecitng means for detecting a notch pattern of the notch bit;
  address information reproducing means for reproducing address information in accordance with the wobble signal reproduced out of the track;
  reference signal extracting means for extracting a reference signal out of the notch bit;
  recording/reproducing clock generating means, to which the reference signal is inputted, for generating a recording/reproducing clock synchronizing with the reference signal; and
  recording/reproducing means for synchronizing a recording position of a bit for recording information with a position of the notch bit, and for thus recording/reproducing information in accordance with the recording/reproducing clock.

* * * * *